(12) United States Patent
Muraoka

(10) Patent No.: US 8,767,865 B2
(45) Date of Patent: Jul. 1, 2014

(54) WIRELESS STATION, AN INTERFERENCE ESTIMATION METHOD, A WIRELESS COMMUNICATION SYSTEM AND A COMPUTER PROGRAM

(75) Inventor: Kazushi Muraoka, Minato-ku (JP)

(73) Assignee: NEC Corporation, Tokyo (JP)

( * ) Notice: Subject to any disclaimer, the term of this patent is extended or adjusted under 35 U.S.C. 154(b) by 254 days.

(21) Appl. No.: 13/238,785

(22) Filed: Sep. 21, 2011

(65) Prior Publication Data

US 2012/0069886 A1  Mar. 22, 2012

(30) Foreign Application Priority Data

Sep. 22, 2010  (JP) .................... 2010-211486

(51) Int. Cl.
*H04B 3/46* (2006.01)
*H04B 17/00* (2006.01)
*H04Q 1/20* (2006.01)

(52) U.S. Cl.
USPC ........... 375/277; 375/224; 375/346; 375/296; 375/284; 375/285; 455/63.1; 455/114.2; 455/114.3; 455/296

(58) Field of Classification Search
USPC ................ 375/224, 227, 346, 296, 284, 285; 455/63.1, 114.2, 114.3, 296
See application file for complete search history.

(56) References Cited

U.S. PATENT DOCUMENTS

2009/0052574 A1* 2/2009 Li et al. .................. 375/296

FOREIGN PATENT DOCUMENTS

JP    2000-138629 A    5/2000

OTHER PUBLICATIONS

Cordeiro, Carlos, et al., "Spectrum Sensing for Dynamic Spectrum Access of TV Bands (Invited Paper)," Proc. IEEE International Symposium on New Frontiers in Dynamic Spectrum Access Network (DySPAN), Oct. 2008.
Gurney, David, et al., "Geo-location Database Techniques for Incumbent Protection in the TV White Space," Proc. International Conference on Cognitive Radio Oriented Wireless Access Networks and Communications (CrownCom), Jul. 2007, pp. 1-9.

* cited by examiner

*Primary Examiner* — Phuong Phu
(74) *Attorney, Agent, or Firm* — Sughrue Mion, PLLC

(57) ABSTRACT

A wireless station of the present invention includes: a synchronization unit configured to synchronize with a transmission suspension period of a transmitting station of a wireless system, a measurement unit configured to measure a reception level of a wireless signal of said transmitting station in a transmission period and a reception level in the transmission suspension period, and an interference estimation unit configured to estimate an amount of interference to another wireless system according to the measured reception level in the transmission suspension period and reception level in the transmission period.

14 Claims, 20 Drawing Sheets

WIRELESS STATION, AN INTERFERENCE ESTIMATION METHOD, A WIRELESS COMMUNICATION SYSTEM AND A COMPUTER PROGRAM

This application is based upon and claims the benefit of priority from Japanese Patent Application No. 2010-211486, filed on Sep. 22, 2010, the disclosure of which is incorporated herein in its entirety by reference

TECHNICAL FIELD

The present application relates to a wireless station, an interference estimation method, a wireless communication system and a computer program.

BACKGROUND ART

Cognitive radio is known as a technology which recognizes the wireless environment of the surroundings and optimizes communication parameters according to the wireless environment. An example of cognitive radio system is where a secondary system (interference giving system) shares a frequency band assigned to a primary system (interference receiving system).

For example, standardization of a wireless regional area network (Wireless Regional Area Network: WRAN) system as a secondary system sharing a frequency band (TV channel) assigned to a TV broadcasting system as a primary system is discussed in IEEE (Institute of Electrical and Electronic Engineers) 802.22 Working Group.

A WRAN system uses spectrum sensing technology to judge a primary system uses a frequency band is used (refer to non-patent literature 1). Here, spectrum sensing indicates reception processing in which a secondary system receives a radio wave of a shared frequency band and which recognizes whether a signal of a primary system exists. A WRAN system as a secondary system needs to check whether a primary system is not communicating in a shared frequency band. In order to check it periodically, a transmission suspension period called a Quiet Period (abbreviated as QP hereafter) is used in the WRAN system, and spectrum sensing is performed within the QP.

FIG. 19 is a figure which illustrates a frame structure of a QP in a WRAN system, in which a QP is inserted in a transmission signal periodically. Also, each QP in a plurality of transmitting stations of the WRAN system is synchronized in the time domain. Spectrum sensing with such a QP makes it possible to sense a signal of a primary system (primary signal) even if it is a weak signal because a WRAN signal (secondary signal) is not transmitted. Accordingly, accuracy of spectrum sensing can be improved.

As mentioned above, in cognitive radio, a secondary system checks whether a primary system in the vicinity is using the frequency band. Therefore, it is necessary to grasp an amount of interference in the secondary system by the use of spectrum sensing, for example, the spectrum sensing using QP mentioned above. On the other hand, it is also important to grasp how much interference is caused (amount of interference) to the primary system by the transmission of the secondary system. That is, when a secondary system shares a frequency band with a primary system, it is necessary for the secondary system to avoid excessive interference to the primary system which exists in the vicinity. It is also necessary for the secondary system not to have an influence on existing services which the primary system provides. An amount of interference to the primary system, for example, can be used for determination of transmission power of the secondary system that is necessary to suppress influence of interference in the primary system within a fixed value.

FIG. 20 is a figure illustrating interference between systems in a general wireless communication system including a primary system and a secondary system. As can be understood from FIG. 20, transmitting station 20 (secondary transmitting station) of a secondary system which performs spectrum sensing suffers interference (suffered interference) by the signal transmitted from transmitting station 10 (primary transmitting station) of a primary system. Also, the signal transmitted from secondary transmitting station 20 causes interference to receiving station 11 (primary receiving station) of the primary system (given interference).

As an example of such technology that grasps an amount of interference to a primary receiving station, technology disclosed in non-patent literature 2 can be mentioned. In non-patent literature 2, the technology which estimates given interference to a primary system is disclosed by specifying a service area of a TV which is a primary system using a TV database and by using propagation loss at a service area border which is estimated based on a propagation model.

Also, as an example of technology in general which grasps an amount of interference, technology disclosed in patent document 1 can be mentioned. In patent document 1, technology which measures interference from a peripheral cell (for example, an adjacent cell) in a cellular system is disclosed. A cell which measures interference from an adjacent cell suspends a signal transmission by installing a space frame (which is a transmission suspension period and corresponds to a QP of a WRAN system) in each of an uplink signal and a downlink signal. The cell measures an amount of suffered interference by the transmission of the adjacent cell in a state that it is not influenced by the transmission of its own cell with the suspension of the signal transmission. Also, an amount of interference from its own cell to the adjacent cell can be measured by using a space frame similarly in the adjacent cell and by the adjacent cell measuring an amount of suffered interference.

Patent document 1: Japanese Patent Application Laid-Open No. 2000-138629

Non-patent literature 1: C. Cordeiro, M. Ghosh, D. Cavalcanti, K. Challapali, "Spectrum sensing for Dynamic Spectrum Access of TV Bands", Proc. IEEE International Symposium on New Frontiers in Dynamic Spectrum Access Network (DySPAN), October 2008.

Non-patent literature 2: D. Gurney, G. Buchwald, L. Ecklund, S. Kuffner, and J. Grosspietsch, "Geo-location database techniques for incumbent protection in the TV white space", Proc. International Conference on Cognitive Radio Oriented Wireless Access Networks and Communications (CrownCom), July 2007.

BRIEF SUMMARY

However, there is a problem that an estimation error of interference becomes large in case the technology disclosed in non-patent literature 2 is applied to estimating an amount of interference under the condition that a propagation model is different from the actual environment.

Also, in case the technology of patent document 1 is applied in order to grasp interference from a secondary system to a primary system, there is a problem mentioned below. The technology of patent document 1 merely discloses that the system which receives interference measures an amount of interference. When the technology of patent document 1 is used in cognitive radio system, a function to measure a secondary signal needs to be added to a primary receiving station. Thus, frequency utilization efficiency itself of the primary system is decreased when a space frame which suspends transmission of a primary signal is added in order to improve detection accuracy of an amount of interference (that is, in order to raise detection accuracy of a secondary signal). Furthermore, a function to notify of a measured value to the secondary system from the primary system is needed. Here, the primary system and the secondary system may not be the same business operators, and there is no guarantee that information such as a measured value can be exchanged between the systems.

As mentioned above, there is a case where it is not desirable to request the primary system to add the function solely for the purpose of the secondary system to share frequency of the primary system.

Certain embodiments of the present invention can solve the problems mentioned above, although it is not necessary for all embodiments of the invention to solve any of the above-mentioned problems. Various embodiments of the invention can include a wireless station, an interference estimation method, a wireless communication system and a computer program which can grasp interference from a secondary system to a primary system with high accuracy and in conformity with actual environment.

Means for Solving the Problems

A wireless station of the present invention includes: a synchronization unit configured to synchronize with a transmission suspension period of a transmitting station of a wireless system, a measurement unit configured to measure a reception level of a wireless signal of said transmitting station in a transmission period and a reception level in the transmission suspension period, and an interference estimation unit configured to estimate an amount of interference to another wireless system according to the measured reception level in the transmission suspension period and reception level in the transmission period.

An interference estimation method of the present invention comprising: synchronizing a transmission suspension period of a transmitting station of a wireless system, measuring a reception level of a wireless signal of said transmitting station during a transmission period and a reception level during the transmission suspension period, and estimating an amount of interference to another wireless system according to the measured reception level in the transmission suspension period and the measured reception level in the transmission period.

A wireless communication system of the present invention includes: a transmitting station which transmits a wireless signal comprising a transmission period and a transmission suspension period, and a monitoring station which synchronizes the transmission suspension period of said transmitting station, measures a reception level of a wireless signal of said transmitting station during the transmission period and during the transmission suspension period, and estimates an amount of interference to another wireless system according to the measured reception level in the transmission suspension period and the measured reception level in the transmission period.

A computer program of the present invention makes a computer execute: A non-transitory computer readable information of the present invention recording medium storing a program which, when executed by a processor, performs a method comprising: synchronizing a transmission suspension period of a transmitting station of a wireless system, measuring a reception level of a wireless signal of said transmitting station during a transmission period and during a transmission suspension period, estimating an amount of interference to another wireless systems according to the reception level in the transmission suspension period and the reception level in the transmission period.

EXEMPLARY EMBODIMENTS

The First Exemplary Embodiment

Figure 1:
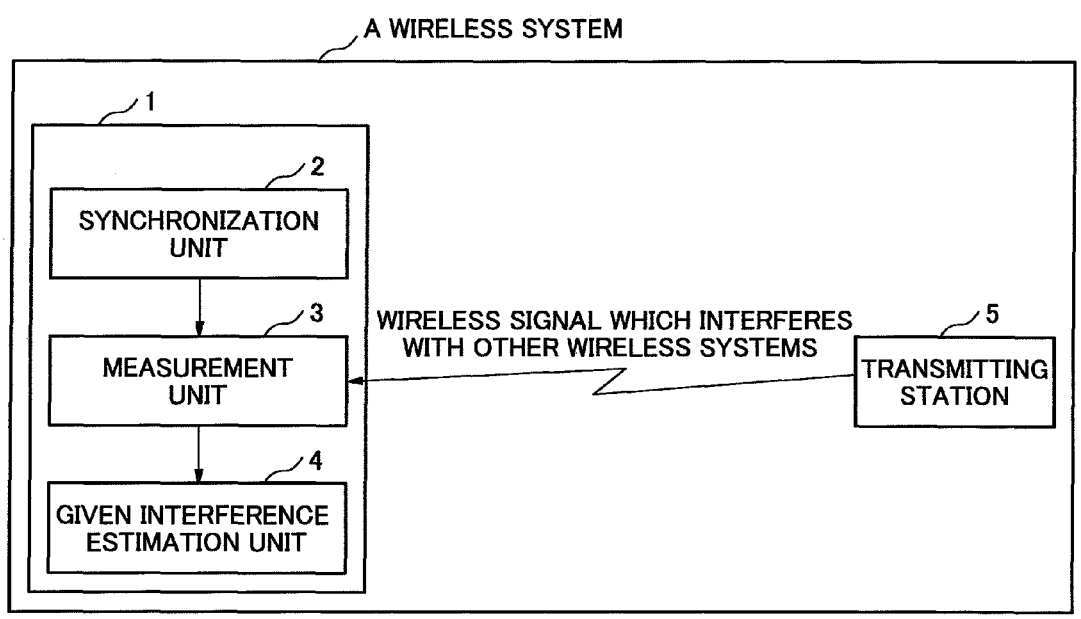
FIG. 1 is A block diagram showing an exemplary configuration of a wireless station according to the first exemplary embodiment of the present invention

FIG. 1 is a block diagram showing an exemplary configuration of a wireless station 1 according to the first exemplary embodiment of the present invention. The wireless station 1 belongs to a wireless system. The wireless station 1 includes a synchronization unit 2 (synchronization means), a measurement unit 3 (measurement means) and a given interference estimation unit 4 (given interference estimation means).

A transmitting station 5 belongs to the wireless system which the wireless station 1 belongs to. In a transmission frequency band of transmitting station 5 which transmits a wireless signal which becomes interference to another wireless system, the synchronization unit 2 synchronizes with a transmission suspension period of the transmitting station 5. The measurement unit 3 measures each reception level of a wireless signal of transmitting station 5 in a transmission period and in a transmission suspension period. The given interference estimation unit 4 estimates an amount of interference which a system causes to another wireless system by subtracting reception level in the transmission suspension period from reception level in the transmission period.

According to the first exemplary embodiment described above, as the estimation of an amount of interference which a wireless system (secondary system) causes to another wireless system (primary system) is performed by actual measurement, which is different from non-patent literature 2. Therefore, the estimation of the amount of interference in conformity with actual environment can be performed.

Also, according to the first exemplary embodiment, it is possible to estimate an amount of interference which a wireless system causes another wireless system within a wireless system. Therefore, it does not influence a structure of another wireless system, which is different from patent document 1.

Also, according to the first exemplary embodiment, it is possible to separate a transmission period and a transmission suspension period in wireless station 1. The amount of interference is measured from the difference between the reception level in each periods by using a transmission suspension period of a transmission signal of transmitting station 5. As a result, because an unnecessary signal (for example, a signal of a transmitting station of another wireless system, or noise which occurs inside wireless station 1) can be excluded, an amount of interference can be measured with high degree of accuracy. Moreover, frequency utilization efficiency of another wireless system does not decrease compared to the wireless system which the technology disclosed in patent document 1 is applied. This is because it is not necessary to make it a structure in which a space frame is inserted in a signal of another wireless system.

Further, in estimation of an amount of interference mentioned above, if a wireless system uses a transmission suspension period assigned to perform spectrum sensing as a transmission suspension period to be used in measurement of reception level, it can be a structure which will not decrease the original frequency utilization efficiency of a wireless system.

The Second Exemplary Embodiment

Figure 2:
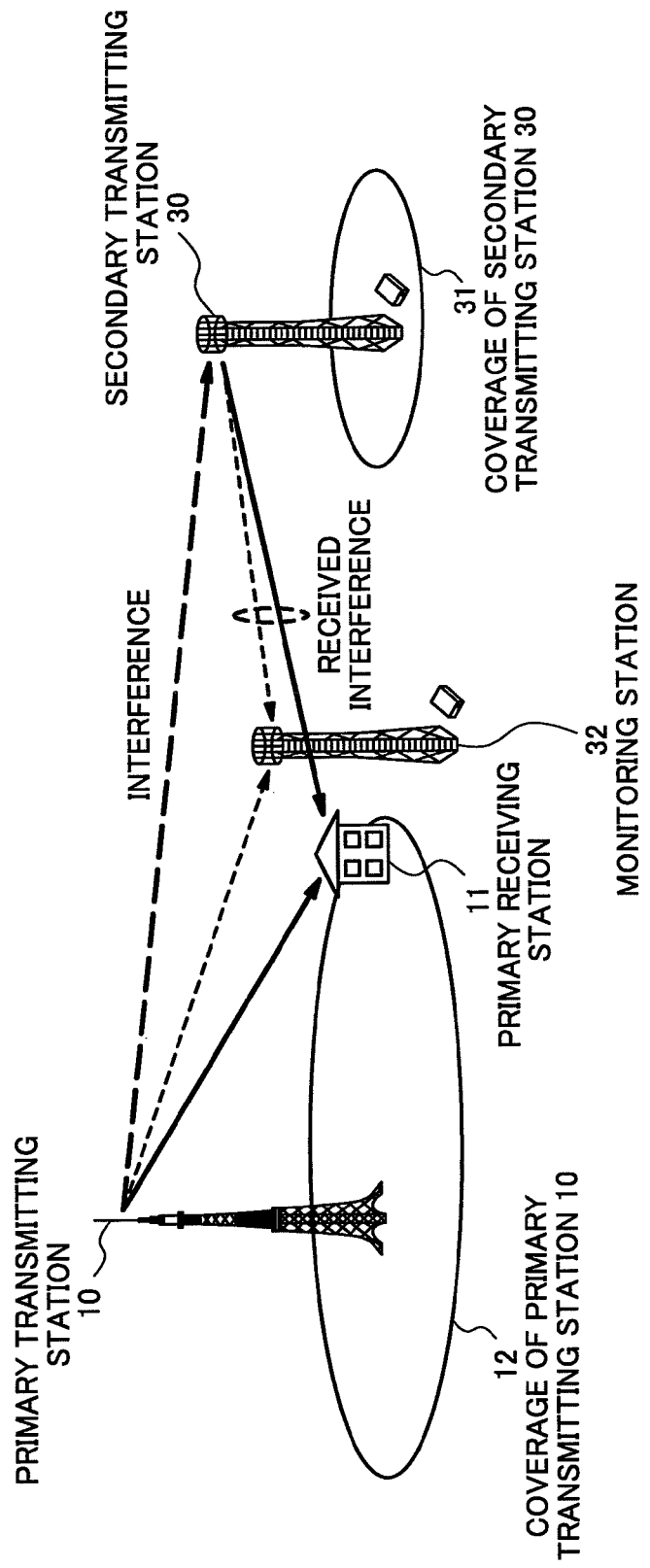
FIG. 2 is A block diagram showing an example of a cognitive radio system according to the second exemplary embodiment of the present invention

FIG. 2 is a block diagram showing an example of a cognitive radio system according to the second exemplary embodiment of the present invention. A cognitive radio system includes a primary system and a secondary system (wireless communication system). In the following example, it is assumed that a primary system is a TV broadcasting system and a secondary system is a cellular system. Of course, it is only an example, and combinations of a primary system and a secondary system are not limited to the above. The combinations of a primary system and a secondary system are, for example, a TV system and a WRAN system, or a TV system and a wireless regional area network or disaster prevention radio communications of local government and so on. Also, the combination of a primary system and a secondary system can be wireless for specific use (for example, such as wireless for apartment house, intra-company self-supporting wireless, or wireless for agriculture) and a cellular system or a wireless LAN (Local Area Network) and so on.

Figure 20:
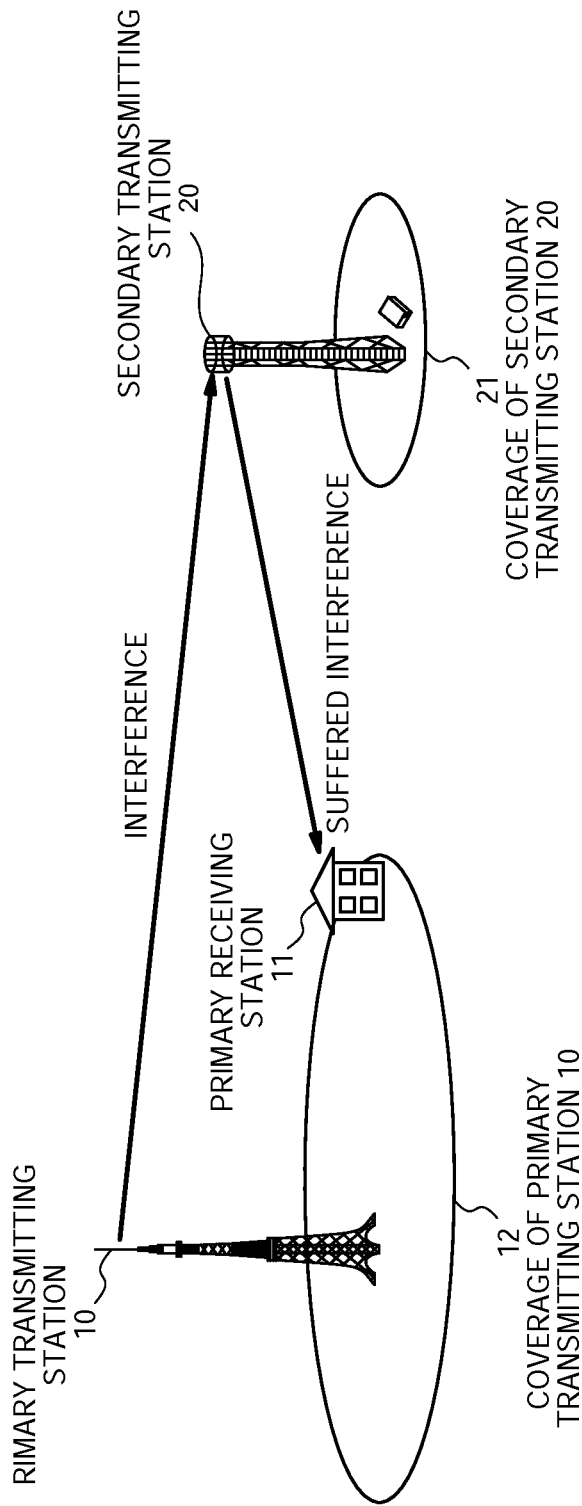
FIG. 20 is A figure illustrating interference between systems in a general wireless communication system including a primary system and a secondary system

It is supposed that a primary system in FIG. 2 is same as a primary system of FIG. 20. A secondary system includes a secondary transmitting station 30 which transmits a wireless signal which becomes interference to a primary system and at least one monitoring station 32 which measures the wireless signal mentioned above. A signal transmitted by the secondary transmitting station 30 will cause interference to a primary receiving station 11. A monitoring station 32 is located within the vicinity of primary receiving station 11, and measures an amount of interference (this is also referred to as an amount of interference) which secondary transmitting station 30 causes to primary receiving station 11.

Here, for example, a base station, a relay station or a terminal station of a cellular system can be the secondary transmitting station 30 and the monitoring station 32. Also, a station which performs monitoring exclusively (monitoring node) can be the monitoring station 32. In the following example, the secondary transmitting station 30 and the monitoring station 32 are base stations. Also it is possible for them to use a core network.

Figure 3:
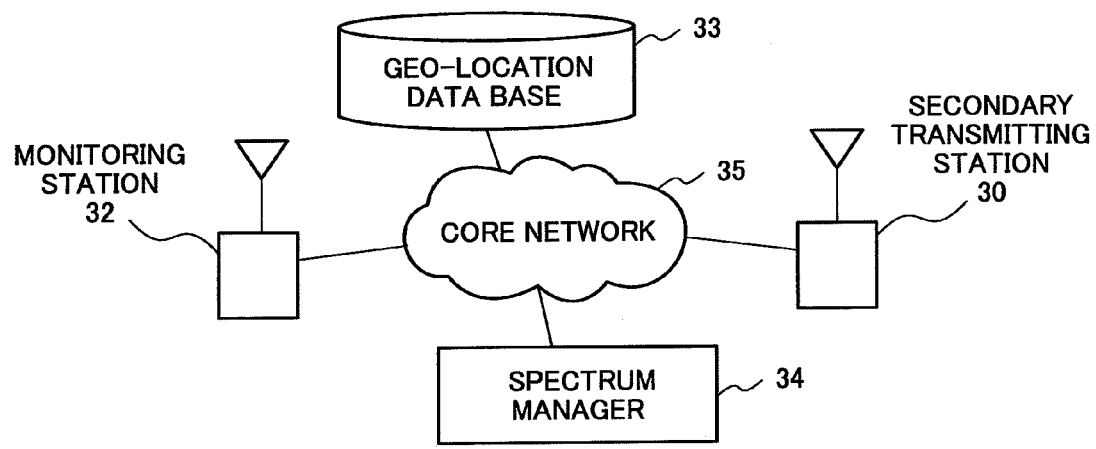
FIG. 3 is A block diagram showing an exemplary configuration of a secondary system which constitutes a cognitive radio system shown in FIG. 2

FIG. 3 is a block diagram showing an exemplary configuration of a secondary system which constitutes a cognitive radio system shown in FIG. 2. A secondary system includes, in addition to the secondary transmitting station 30 and the monitoring station 32 shown in FIG. 2, a geo-location data base 33, a spectrum manager 34 and a core network 35 which connects them. The secondary system can include a structure other than the one described above (for example, other base station or mobile terminals). However, these structures are not related to this exemplary embodiment directly, therefore, they are not shown in FIG. 3 in order to make description clear.

The geo-location data base 33 stores certain information concerning a primary system and a secondary system (for example, information on: location of a wireless station, coverage of a wireless station, transmission power, height of an antenna, directivity of an antenna, and so on). The geo-location data base 33 provides this information, if necessary, to a requesting party (for example, secondary transmitting station 30, monitoring station 32 and spectrum manager 34).

Basically, the spectrum manager 34 has a function to manage a frequency of a secondary system. The spectrum manager 34 assigns a frequency, for example, to a transmitting station which requests secondary use of a frequency band which a primary system uses (for example, secondary transmitting station 30). Further, it is also possible for the spectrum manager 34 to relay communication between the secondary transmitting station 30 and the monitoring station 32. Specifically, the spectrum manager 34 transmits, for example, "monitoring request" from secondary transmitting station 30 to monitoring station 32. Also, the spectrum manager 34 transmits a monitoring result received from the monitoring station 32 (such as measured result, judgment result or transmission output value (for example, transmission power set value or transmission power fluctuation information)) to the secondary transmitting station 30. Further, the spectrum manager 34 can be an independent device or it can be included as a function within an identical device as the secondary transmitting station 30 or the monitoring station 32.

The core network 35 is a network with which the secondary transmitting station 30, the monitoring station 32, the geo-location data base 33 and the spectrum manager 34 communicate. This network can be a core network which is closed within a telecommunications carrier, or can also be a network which extends over a plurality of telecommunications carriers. Also, this network can be a wired network or can be a wireless network.

Figure 4:
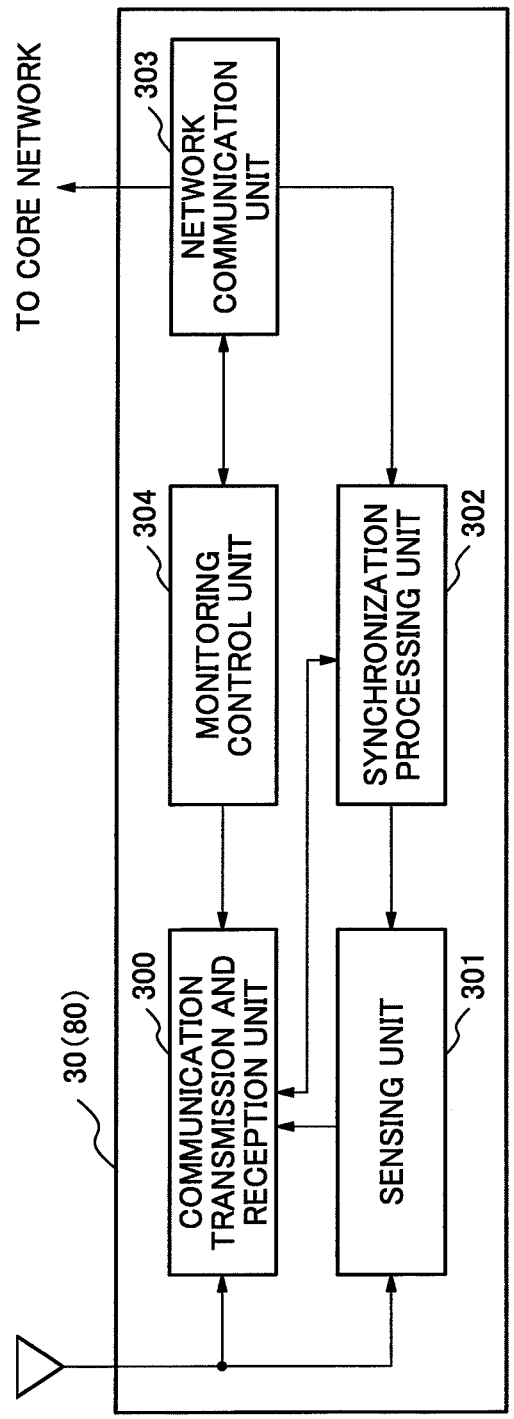
FIG. 4 is A block diagram showing an exemplary configuration of a secondary transmitting station shown in FIG. 3

FIG. 4 is a block diagram showing an exemplary configuration of the secondary transmitting station 30. The secondary transmitting station 30 includes a communication transmission and reception unit 300, a sensing unit 301, a synchronization processing unit 302, a network communication unit 303 and a monitoring control unit 304. Also, it is possible for the secondary transmitting station 30 to communicate with the geo-location data base 33, the spectrum manager 34 and the monitoring station 32 via the core network 35.

The communication transmission and reception unit 300 includes a function to communicate with a terminal of a secondary system which exists within a coverage 31 of the secondary transmitting station 30 (secondary terminal, not illustrated) and so on. The communication transmission and reception unit 300 includes, specifically, a band-pass filter which limits transmission and reception of radio wave outside of a desired frequency band, a frequency conversion unit which performs frequency conversion between a signal of RF (Radio Frequency) band and a baseband signal, a D/A conversion unit (Digital to Analog conversion unit), an A/D conversion unit (Analog to Digital Conversion unit), a modulation and demodulation unit, a coding unit and a decoding unit. Also, in order to perform spectrum sensing in the sensing unit 301, the communication transmission and reception unit 300 sets a transmission suspension period (same as Quiet Period (QP) mentioned above) in a transmission signal and performs communication. Information concerning this transmission suspension period is exchanged with the synchronization processing unit 302. Also, the communication transmission and reception unit 300 receives transmission control directions according to the judgment result of spectrum sensing from the sensing unit 301, and performs transmission control. The examples of the transmission control are: continual use of a frequency band which is being used, transmission suspension, and adjustment of transmission power. Also, the communication transmission and reception unit 300 receives transmission control directions according to the monitoring result of monitoring station 32 from the monitoring control unit 304, and performs transmission control.

The sensing unit 301 checks, by spectrum sensing, usage status of a frequency band by a primary system. In case a frequency band in which spectrum sensing is performed is the one which the secondary transmitting station 30 uses, spectrum sensing is performed within a transmission suspension period. From this sensing, spectrum sensing can be performed in a state which does not suffer influence of its own transmission. This transmission suspension period is designated from the synchronization processing unit 302. Also, the sensing unit 301 decides transmission control according to the result of spectrum sensing and outputs transmission control directions to the communication transmission and reception unit 300.

In case a frequency band in which spectrum sensing is performed is not the one which the secondary transmitting station 30 uses, the period which spectrum sensing is performed may be the identical with or different from a transmission suspension period within a transmission signal of secondary transmitting station 30. Further, as a example of spectrum sensing, electric power detection in which electric power of a frequency band is measured and existence of frequency usage by a primary system is judged, or any other well known technique can be used.

The network communication unit 303 includes a function to communicate with the geo-location data base 33, the spectrum manager 34 and the monitoring station 32 via the core network 35. Further, a network which the network communication unit 303 uses can be a core network or can be a wireless network.

The synchronization processing unit 302 outputs information concerning a transmission suspension period to the sensing unit 301. Here, three cases can be considered concerning a transmission suspension period. One case is that the spectrum manager 34 decides the period. Second case is that the secondary transmitting station 30 decides the period by itself. Last case is that it is decided in advance. Any case can be used in deciding the period. For example, in case the spectrum manager 34 decides a transmission suspension period, the synchronization processing unit 302 communicates with the spectrum manager 34 via the network communication unit 303 and receives information concerning the transmission suspension period. In this case, the synchronization processing unit 302 outputs information concerning the transmission suspension period to the sensing unit 301 and the communication transmission and reception unit 300. The communication transmission and reception unit 300 inserts the transmission suspension period in a transmission signal. On the other hand, in case the secondary transmitting station 30 decides a transmission suspension period by itself, the transmission suspension period is decided by the communication transmission and reception unit 300. The communication transmission and reception unit 300 inserts the transmission suspension period which it decided in a transmission signal and outputs it to the synchronization processing unit 302. The synchronization processing unit 302 outputs acquired information concerning the transmission suspension period to the sensing unit 301.

The monitoring control unit 304 transmits a monitoring request to the monitoring station 32 via the network communication unit 303. In that case, the monitoring request can be transmitted to the monitoring station 32 directly from the network communication unit 303 or it can be transmitted via the spectrum manager 34.

Further, it is possible to include information concerning a frequency band which the communication transmission and reception unit 300 uses and which becomes a monitoring target in a monitoring request information. Also it is possible to include information concerning a transmission suspension period in a monitoring request information. Here, information concerning a frequency band which becomes a monitoring target is, for example, information concerning a frequency band (channel) of a primary system with which the secondary transmitting station 30 to communicate, and is a serial number of a channel decided in advance, a central frequency of a channel, a bandwidth, and so on. Also, information concerning a transmission suspension period is information by which the monitoring station 32 can grasp a transmission suspension period of the secondary transmitting station 30 such as: the time which a transmission suspension period starts, time length of a transmission suspension period, and cycle time in case a transmission suspension period is inserted periodically.

Also, the monitoring control unit 304 receives a monitoring result of the monitoring station 32 via the network communication unit 303. In case a received monitoring result is directions of transmission control, such as transmission output value and so on, the monitoring control unit 304 outputs the received monitoring result to the communication transmission and reception unit 300. On the other hand, in case a received monitoring result is a measured value of an amount of interference in the monitoring station 32 or an estimated value of the amount of interference to a primary receiving station, the monitoring control unit 304 decides transmission control directions from the measured value of interference or the estimated value of interference. The monitoring control units 304 outputs the control directions to the communication transmission and reception unit 300.

Also, in case a plurality of wireless stations including a monitoring function exist among the wireless stations of a secondary system (secondary wireless stations), the monitoring control unit 304 can select a monitoring station from a plurality of secondary wireless stations (it is supposed that monitoring station 32 is one of wireless stations selected among a plurality of secondary wireless stations). In that case, a secondary wireless station which is not using a frequency band of a monitoring target for transmission can be selected as a monitoring station. In the following description, it is supposed that a secondary wireless station which is located in the vicinity of a coverage border of a primary system which suffers interference by transmission of secondary transmitting station 30 is selected as monitoring station 32.

Figure 5:
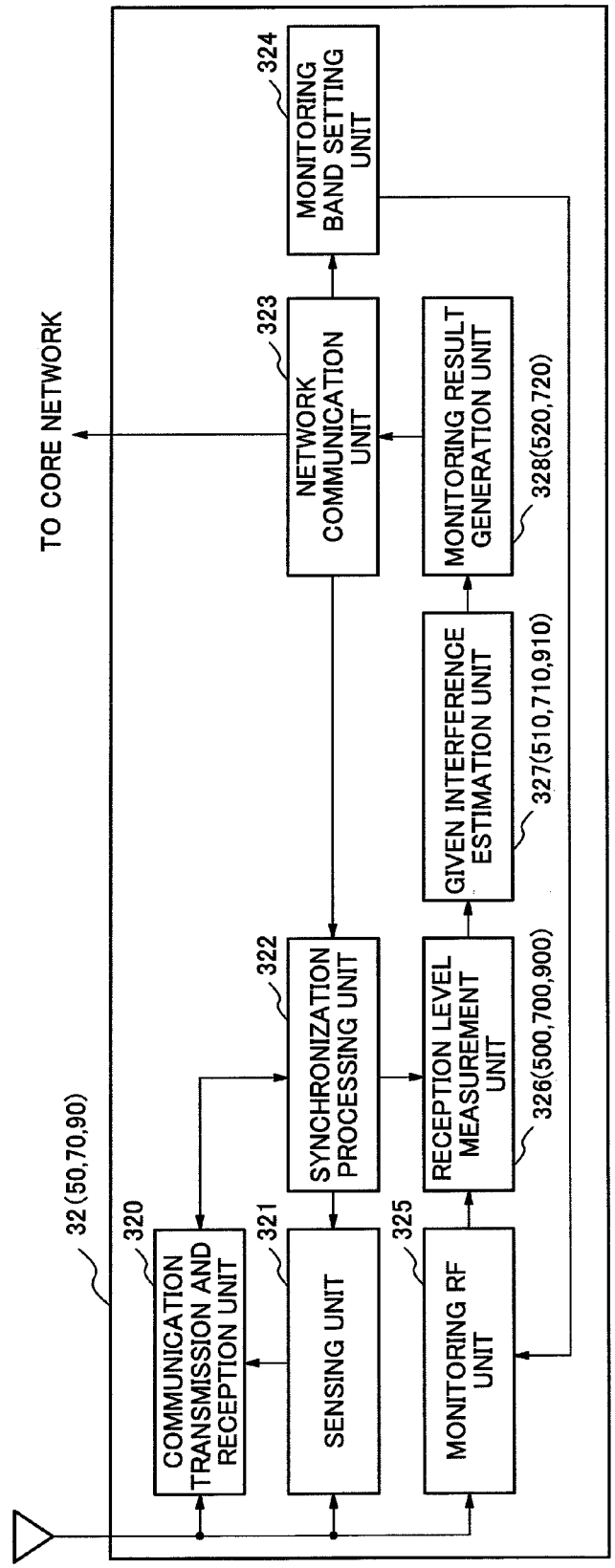
FIG. 5 is A block diagram showing an exemplary configuration of a monitoring station shown in FIG. 3

FIG. 5 is a block diagram showing an exemplary configuration of the monitoring station 32 shown in FIG. 3. The monitoring station 32 includes a communication transmission and reception unit 320, a sensing unit 321, a synchronization processing unit 322 (synchronization means), a network communication unit 323 and a monitoring band setting unit 324. Further, the monitoring station 32 includes a monitoring RF unit 325, a reception level measurement unit 326 (measurement means), a given interference estimation unit 327 (given interference estimation means) and a monitoring result generation unit 328. Further, in the following description, although these units are described, owing to the convenience of description, it is not in the order of the code mentioned above. Also, it is possible for the monitoring station 32 to communicate with the geo-location data base 33, the spectrum manager 34 and the secondary transmitting station 30 via the core network 35.

The communication transmission and reception unit 320 includes a function for the monitoring station 32, as a secondary wireless station, to communicate with a terminal of a secondary system (secondary terminal, not illustrated) and so on which exists in its own coverage area. The structure of the communication transmission and reception unit 320 is the same as the communication transmission and reception unit 300 in the secondary transmitting station 30. Further, in FIG. 5, in order to make a characteristic function as a monitoring station clear, the function corresponding to the monitoring control unit 304 included in the secondary transmitting station 30 is not illustrated. However, the monitoring station 32 can also include the monitoring control unit 304, which is the same as the secondary transmitting station 30.

The sensing unit 321 includes a function to grasp usage status of a frequency band which a primary system uses by spectrum sensing. The detailed description will be omitted here because this function is the same function as the sensing unit 301 in the secondary transmitting station 30, and it is described above.

The network communication unit 323 includes a function to communicate with the secondary transmitting station 30, the geo-location data base 33 or the spectrum manager 34 via the core network 35.

The synchronization processing unit 322 receives information concerning a transmission suspension period from the secondary transmitting station 30 or the spectrum manager 34 via the network communication unit 323. Also, the synchronization processing unit 322 exchanges information concerning a transmission suspension period with the communication transmission and reception unit 320. There are two types of the transmission suspension period. One is a transmission suspension period for performing spectrum sensing to a frequency band used by the communication transmission and the reception unit 320 (that is, time when communication of monitoring station 32 is suspended). Another is a transmission suspension period in a frequency band in which monitoring is performed and which is sent together with a monitoring request from the secondary transmitting station 30 (that is, time when secondary transmitting station 30 suspends transmission). The synchronization processing unit 322 outputs information concerning the former type of the transmission suspension period to the sensing unit 321 and outputs information concerning the latter type of the transmission suspension period to reception level measurement unit 326.

The monitoring band setting unit 324 receives a monitoring request transmitted from the secondary transmitting station 30 or the spectrum manager 34 via the network communication unit 323. The monitoring band setting unit 324 outputs information concerning a frequency band of monitoring target included in the monitoring request to monitoring the RF unit 325.

The monitoring RF unit 325 converts, among an RF signal received from an antenna and based on information concerning a frequency band which was inputted from the monitoring band setting unit 324, the RF signal of the frequency band of a monitoring target into a digital baseband signal. The monitoring RF unit 325 also outputs the converted digital baseband signal to the reception level measurement unit 326. Here, "the frequency band of a monitoring target" means the frequency band which the secondary transmitting station 30 uses for transmission. Further, the monitoring station 32 measures a wireless signal of the secondary transmitting station 30 and does not measure a wireless signal which the monitoring station 32 transmits by itself.

Also, this output signal to the reception level measurement unit 326 does not need to be a digital baseband signal. An RF signal or an IF (Intermediate Frequency) signal can be inputted to reception level measurement unit 326. In the following description, in order to make description clear, only a case that the monitoring RF unit 325 outputs a digital baseband signal is described.

Specifically, the monitoring RF unit 325 first amplifies an RF signal inputted to a low noise amplifier (not illustrated) within the monitoring RF unit 325. Next, the monitoring RF unit 325 extracts an RF signal which to be monitored by a band-pass filter (not illustrated) among the amplified signal. A frequency conversion unit (not illustrated) within monitoring RF unit 325 converts the extracted RF signal of the desired frequency band into a baseband signal. The baseband signal does sampling and quantization by an A/D conversion unit within monitoring RF unit 325, and is converted from an analog signal into a digital signal.

The reception level measurement unit 326 receives a digital baseband signal in a frequency band of a monitoring target from monitoring RF unit 325. The reception level measurement unit 326 also measures transmission suspension period inputted from the synchronization processing unit 322 and time other than that (hereinafter, called as a transmission period), respectively.

As a method for measurement of a reception level, for example, electric power detection which measures directly received power for a received digital baseband signal or measurement using characteristic quantity included in a transmission signal of secondary transmitting station 30 can be mentioned. However, as far as it is a method which can measure the reception level, any kind of method can be used. Further, as measurement using a characteristic quantity mentioned above, for example, a method using a cross correlation value with a pilot signal included in a secondary signal, a method using an auto-correlation value so that a CP signal of an OFDM signal can overlap, and so on can be mentioned. Further, in the above, OFDM is an abbreviation of Orthogonal Frequency Division Multiplexing. Also, CP is an abbreviation of Cyclic Prefix. The detail of the characteristic quantity will be described later.

In the following description, as an example of reception level detection, an example that "electric power detection" is used for reception level detection is described.

Figure 6:
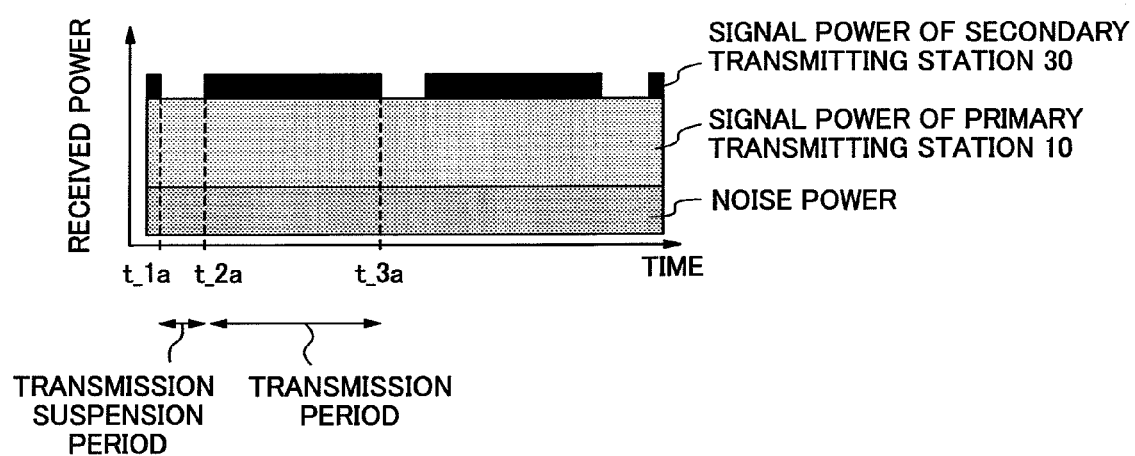
FIG. 6 is A figure showing an example of received power of a frequency band of a monitoring target received by a monitoring station

FIG. 6 is a figure showing an example of received power which a monitoring target received by the reception level measurement unit 326 of monitoring station 32 in a frequency band. In FIG. 6, a horizontal axis indicates time and a vertical axis indicates received power. FIG. 6 indicates a figure which a transmission suspension period (in FIG. 6, for example, time from time t_1a to time t_2a) is inserted in a transmission signal from the secondary transmitting station 30 (that is, a signal of a frequency band of a monitoring target) periodically. In this example, as can be understood from FIG. 6, received power in the transmission suspension period (in FIG. 6, time from time t_1a to time t_2a) will be electric power where signal power of primary transmitting station 10 and noise power which occurs inside the monitoring station 32 are superposed On the other hand, received power in the transmission period (in FIG. 6, time from time t_2a to time t_3a) will be electric power where signal power of secondary transmitting station 30 is further superposed in addition to signal power of the primary transmitting station 10 and noise power of the monitoring station 32. The reception level measurement unit 326 measures the received power in each of a transmission suspension period and a transmission period by performing "electric power detection".

Here, the detail of electric power detection mentioned above will be described. In the electric power detection, the received power of a transmission suspension period $P_{OFF}$ is calculated by performing calculation of (formula 1) to a digital baseband signal. On the other hand, received power of a transmission period $P_{ON}$ is calculated by performing calculation of (formula 2) to a digital baseband signal.

$$P_{OFF} = \frac{1}{N2 - N1} \sum_{n=N1}^{N2} |y(n)|^2 \quad \text{(formula 1)}$$

$$P_{ON} = \frac{1}{N3 - N2} \sum_{n=N2}^{N3} |y(n)|^2 \quad \text{(formula 2)}$$

Further, in (formula 1) and (formula 2), y(n) is an equivalent baseband expression of a digital baseband signal, and n is an index of sampled time. Also, N1, N2 and N3 are sampling indexes corresponding to time t_1a, t_2a and t_3a (all refer to FIG. 6) respectively. The reception level measurement unit 326 outputs the received power ($P_{OFF}$ and $P_{ON}$) obtained in this way to the given interference estimation unit 327.

Further, in (formula 1) and (formula 2) mentioned above, received power is calculated by using a digital baseband signal of a transmission suspension period and a transmission period, but it is not limited to this. For example, there is a case which a transmission signal of the secondary transmitting station 30 can be received by a monitoring station with propagation delay. In such a case, a possibility rises that correct received power cannot be measured. For example, although secondary transmitting station 30 suspends transmission at time t_1a, a transmission signal before time t_1a can become a delayed wave with propagation delay and arrives at monitoring station 32. In this case a secondary signal can be received by the monitoring station at time after t_1a. On the other hand, although secondary transmitting station 30 begins transmission at time t_2a, a secondary signal can not be received yet by monitoring station 32, due to influence of propagation delay, at time t_2a. In consideration of such a case, it is possible to perform electric power detection from the starting time where an offset of estimated propagation delay time is added. For example, in case the offset mentioned above is supposed to be Δ, sampling indexes corresponding to time t_1a+Δ, time t_2a+Δ and time t_3a+Δ can be set to N1, N3 and N3 respectively.

Also, in case measurement is performed by the same method as spectrum sensing used in the sensing unit 321 (for example, electric power detection mentioned above), it is possible for the reception level measurement unit 326 to use the common circuit.

The given interference estimation unit 327 calculates an amount of interference P from transmission of secondary transmitting station 30 by using following (formula 3) according to received power in a transmission suspension period $P_{OFF}$ and received power in a transmission period $P_{ON}$ inputted from the reception level measurement unit 326

$$P = P_{ON} - P_{OFF} \quad \text{(formula 3)}$$

In this way, the amount of interference calculated in the given interference estimation unit 327 is inputted to the monitoring result generation unit 328.

The monitoring result generation unit 328 transmits the amount of interference inputted from the given interference estimation unit 327 to the secondary transmitting station 30 as a monitoring result via the network communication unit 323. Further, an amount of given interference is an example of a monitoring result. It is possible to transmit CIR (Carrier to Interference Ratio) to secondary transmitting station 30 instead of the amount of given interference. Here, CIR can be calculated, for example, by calculating electric power of a primary signal by subtracting noise power measured in advance from received power in a transmission suspension period $P_{OFF}$, and by subtracting an amount of given interference from the electric power of the primary signal (in case expressed in dB).

Also, for a monitoring result, it is not limited to a measured result in the monitoring station 32 such as an amount of interference or CIR. For a monitoring result, it is also possible to use an estimated result calculated according to a measured result such as an estimated value of an amount of interference or an estimated value of CIR in the primary receiving station 11 For example, it is possible to use a value which corrects the received power difference produced by the difference in receiving environment between the secondary signal (interference giving signal) at the monitoring station 32 and at the primary receiving station 11 as an estimated value of an amount of interference in the primary receiving station 11. Here, the difference in receiving environment represents the receiving gain difference produced by the difference in the directivities of a reception antenna of monitoring station 32 and primary receiving station 11, and the difference between the propagation loss produced by the difference in height of a reception antenna or by the difference in propagation distances of monitoring station 32 and primary receiving station 11. It is possible to calculate the correction value based on the information related to the primary system (information concerning: location of primary transmitting station 10, coverage of primary transmitting station 10, transmission power of primary transmitting station 10, height of an antenna and directivity of an antenna of primary transmitting station 10 and primary receiving station 11, and so on) acquired from geo-location data base 33 via network communication unit 323.

A monitoring result is not limited to a measured result or the estimated result mentioned above. Further it is possible to use a judgment result or a decided result according to the measurement result whether an interference quantity permitted by a primary receiving station is exceeded as a monitoring result. Also, it is possible to use a transmission output value which is calculated according to the measured result or the estimated result (for example, transmission power set value or transmission power fluctuation information).

As mentioned above, it is possible for the monitoring result generation unit 328 to transmit generated estimation result, decided result, transmission output value as the monitoring result to the secondary transmission station 30 instead of the measured result of an amount of giving interference.

Also, instead of transmitting a monitoring result to secondary transmitting station 30 directly from monitoring station 32, and it is also possible to transmit the monitoring result to secondary transmitting station 30 via spectrum manager 34. In this case, the spectrum manager 34 can deal with processing which calculates a judgment result from a measured result or processing which calculates a transmission output value from a measured result can be performed.

Figure 7:
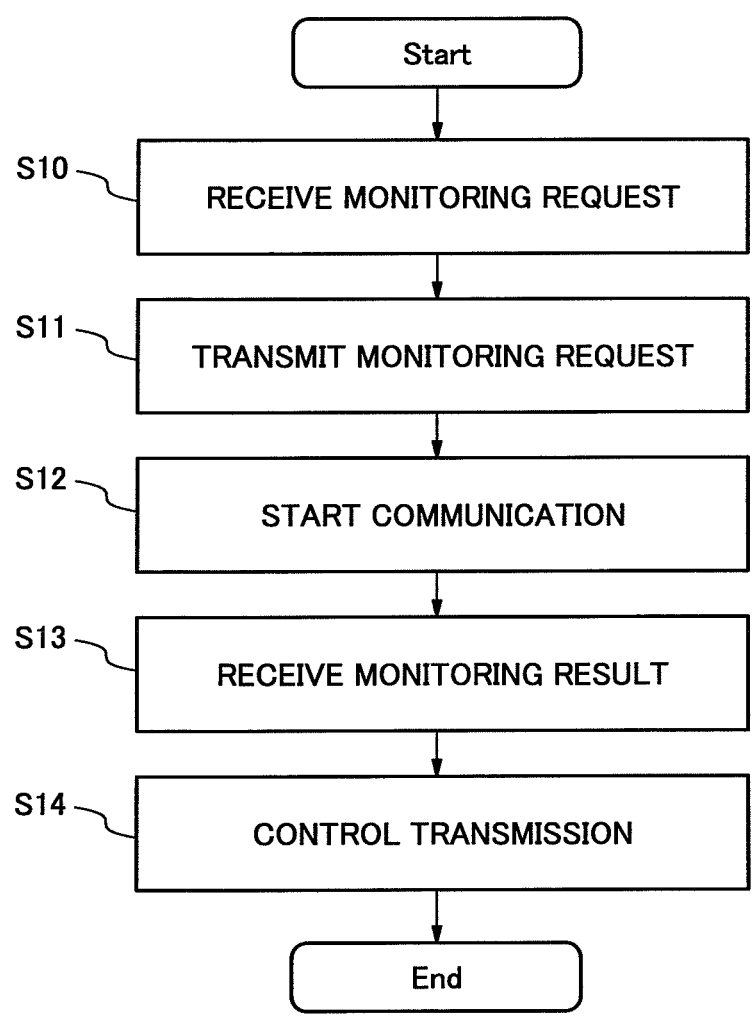
FIG. 7 is A flow chart showing an example of operation of a secondary transmitting station

FIG. 7 is a flow chart showing an example of operation of secondary transmitting station 30. When communicating by sharing a frequency band of a primary system, monitoring control unit 304 of secondary transmitting station 30 generates a monitoring request (Step S10). In the monitoring request, it is possible to transmit the monitoring request which include information concerning a frequency band which is used in communication transmission and reception section 300 and which becomes a monitoring target, or information concerning a transmission suspension period and transmit it. Monitoring control unit 304 transmits the generated monitoring request to monitoring station 32 via network communication unit 303 (Step S11). In that case, the monitoring request can be transmitted to monitoring station 32 directly from network communication unit 303, or can be transmitted via spectrum manager 34. Secondary transmitting station 30 communicates in a frequency band of the primary system (frequence band designated by the monitoring request) (Step S12). The transmission signal used for communication here is measured by monitoring station 32 which made the monitoring request.

The monitoring control unit 304 of the secondary transmitting station 30 receives the monitoring result of the signal transmitted by the secondary transmitting station 30 via network communication unit 303 (Step S13). The monitoring is performed by monitoring station 32. The monitoring control unit 304 outputs the received monitoring result to the communication transmission and reception unit 300, and performs transmission control (Step S14).

Figure 8:
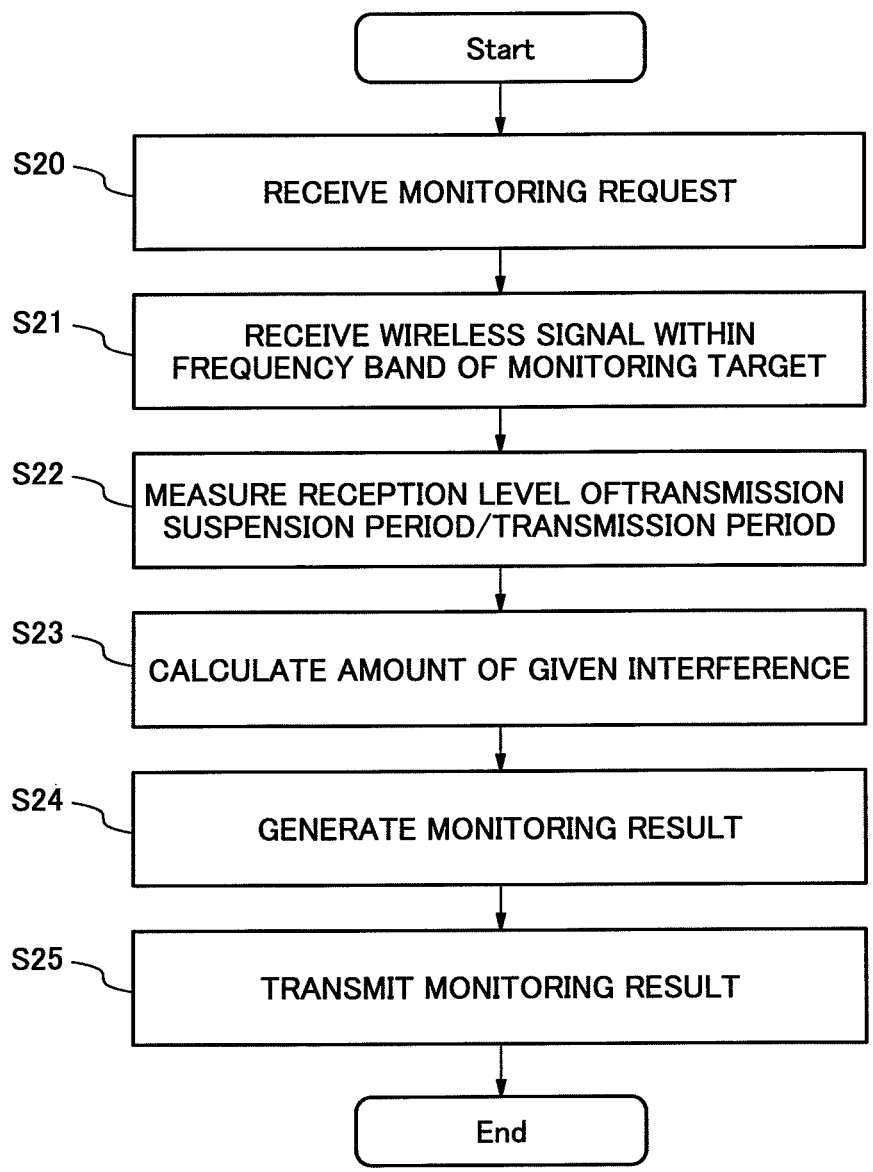
FIG. 8 is A flow chart showing an example of operation of a monitoring station

FIG. 8 is a flow chart showing an example of operation of monitoring station 32. The monitoring band setting unit 324 of the monitoring station 32 receives the monitoring request transmitted from the secondary transmitting station 30 (or the spectrum manager 34) via the network communication unit 323 (Step S20). The monitoring band setting unit 324 sets information concerning a frequency band of a monitoring target included in the monitoring request to the monitoring RF unit 325. The monitoring RF unit 325 receives a wireless signal of a frequency band of a monitoring target (Step S21). The monitoring RF unit 325 converts, among received wireless signals, a wireless signal of a frequency band of a monitoring target into a digital baseband signal and outputs the digital baseband signal which is converted to the reception level measurement unit 326. The reception level measurement unit 326 measures reception level of an inputted digital baseband signal for a transmission suspension period and a transmission period respectively and individually (Step S22). In the given interference estimation unit 327, interference power is calculated by subtracting the received power in a transmission suspension period from the received power in a transmission period which are measured by the reception level measurement unit 326 (Step S23). The monitoring result generation unit 328 generates a monitoring result based on a calculated interference power (Step S24). Here, for example, it is possible to use a measured result of interference power or CIR, an estimated value of given interference power or an estimated value of CIR of primary receiving station 11, a judgment result or a transmission output value as the monitoring result. The generated monitoring result is transmitted to the secondary transmitting station 30 via the network communication unit 323 (Step S25).

According to the second exemplary embodiment described above, as the estimation of an amount of interference which a secondary system causes to a primary system is performed based on actual measurement, which is different from non-patent literature 2. Therefore, the estimation of an amount of given interference in conformity with actual environment can be performed.

Also, according to the second exemplary embodiment, it is possible to estimate an amount of interference which a secondary system causes to a primary system within the secondary system. Therefore, it does not influence a structure of the primary system, which is different from patent document 1.

Also, according to the second exemplary embodiment, it is possible to separate a transmission period and a transmission suspension period in wireless station 1. The amount of interference is measured from the difference between the reception level in each periods by using a transmission suspension period of a transmission signal of transmitting station 5. As a result, the amount of interference can be measured with a high degree of accuracy. Moreover, and frequency utilization efficiency of the primary system does not decrease compared to the wireless system which the technology disclosed in patent document 1 is applied. This is because Further, in the estimation of an amount of interference mentioned above, if a transmission suspension period which a secondary system has set in order to perform spectrum sensing is used as a transmission suspension period used for monitoring, it can be a structure which will not decrease the original frequency utilization efficiency of the secondary system.

Further, in the description mentioned above, although it is explained that the transmission suspension period in which the monitoring station 32 measures a reception level is a transmission suspension period which the secondary transmitting station 30 prepared in order to perform spectrum sensing, it is not limited to this. For example, in addition to a transmission suspension period for the secondary transmitting station 30 to perform spectrum sensing, it is possible to prepare a different transmission suspension period and use it as a transmission suspension period at the time of reception level measurement by the monitoring station 32.

Further, in the description mentioned above, a case which a monitoring station is only one has been described. However, a plural of monitoring stations can exist.

The Third Exemplary Embodiment

The characteristic of the third exemplary embodiment in the present invention that a plurality of the secondary transmitting stations synchronize each of transmission suspension periods. Further, in order to make the description clear, the same structure as the second exemplary embodiment will be omitted.

Figure 9:
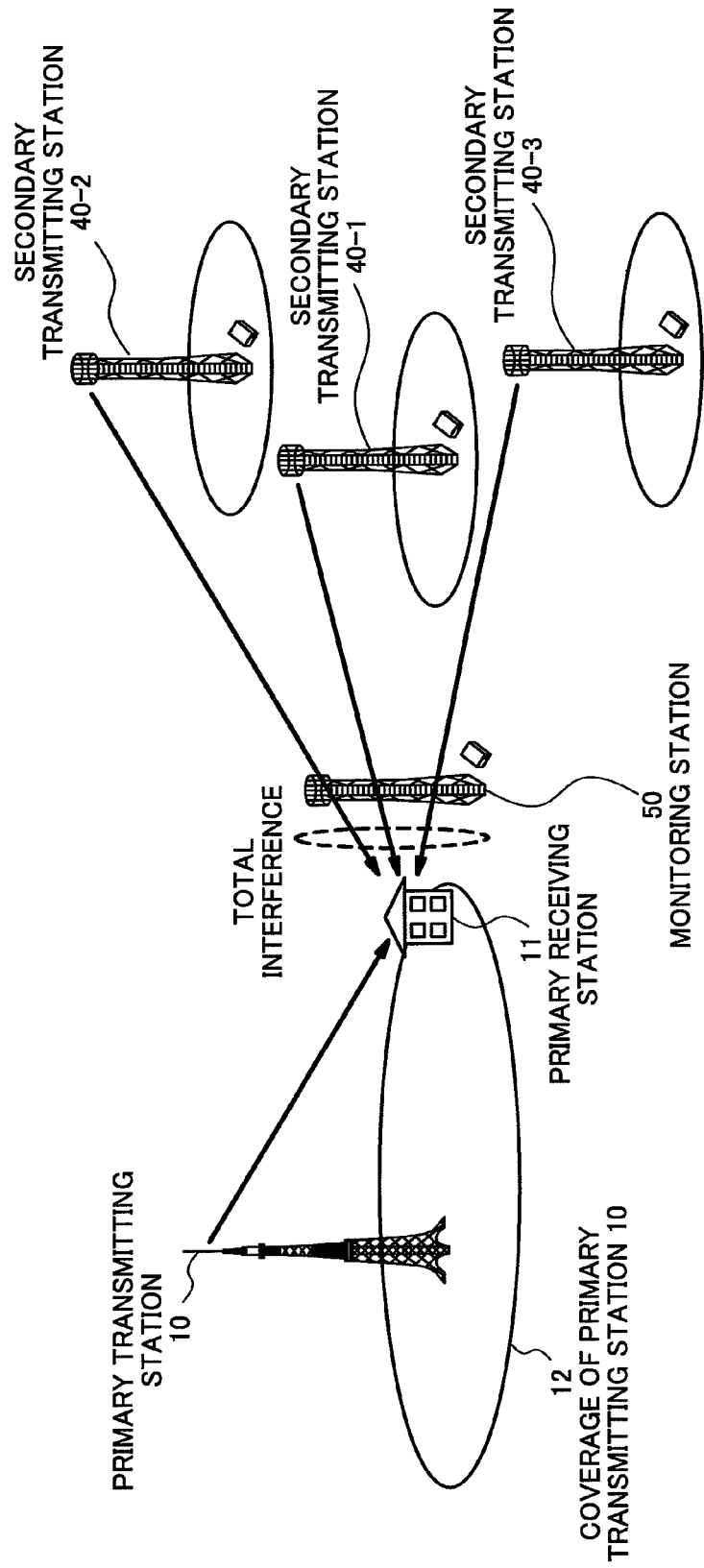
FIG. 9 is A block diagram showing an example of a cognitive radio system according to the third exemplary embodiment of the present invention

FIG. 9 is a block diagram showing an example of a cognitive radio system according to the third exemplary embodiment of the present invention. In FIG. 9, it is supposed that a plurality of the secondary transmitting stations 40-1, 40-2 and 40-3 share a frequency band of a primary system and communicate by use of the frequency. Also, the secondary system includes a monitoring station 50 (the detail of this station will be described later). Also, in FIG. 9, the primary system is the same as FIG. 2 (the second exemplary embodiment). Of course, in this exemplary embodiment, the number of the secondary transmitting station is not limited to three stations and can be set to two stations or no smaller than four stations. In the following example, a case which secondary transmitting stations are three stations (40-1, 40-2 and 40-3) will be described.

As shown in FIG. 9, a plurality of secondary signals will form a synthesized interfering signal and cause interference to the primary receiving station 11 as a result of a plurality of the secondary transmitting stations using a frequency band of a primary system. In order to protect the communication of the primary system, it is necessary to suppress, not the interference of a single secondary transmitting station, but the amount of interference which the entire secondary system causes (total amount of interference) to within no more than the constant value. Also, on the side of the secondary system, if the total amount of interference to the primary system can be estimated, it can be utilized for transmission control. This exemplary embodiment is the one which estimates the total amount of interference mentioned above.

The difference between secondary transmitting stations (40-1, 40-2 and 40-3) in this exemplary embodiment and secondary transmitting station 30 in the second embodiment is only in a structure of a transmission suspension period. Therefore, only this point will be explained in the following description. Accordingly, the structure of the secondary transmitting stations (40-1, 40-2 and 40-3) in this exemplary embodiment is identical with the structure of the secondary transmitting station 30 (FIG. 4) of the second exemplary embodiment.

Figure 10:
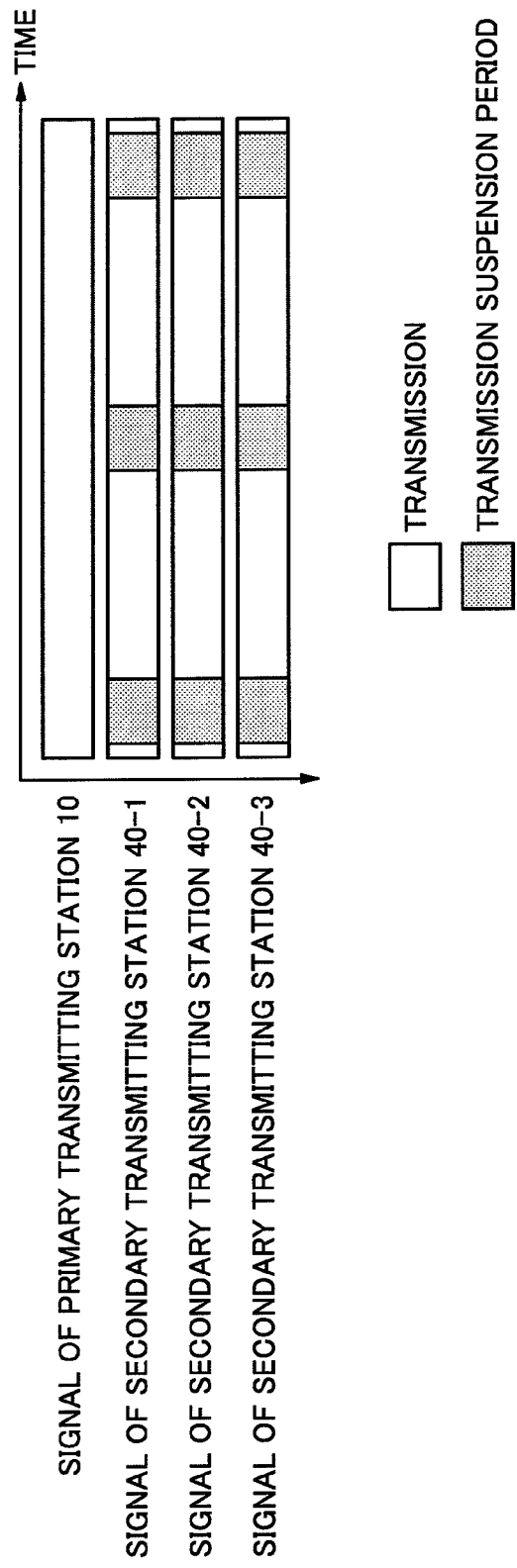
FIG. 10 is A figure showing an example of time structure of a signal of a secondary transmitting station in the third exemplary embodiment

FIG. 10 is a figure showing an example of time structure of a signal transmitted by a secondary transmitting station in this exemplary embodiment. The secondary transmitting stations (40-1, 40-2 and 40-3) of this exemplary embodiment synchronize each of the transmission suspension periods. That is, at each secondary transmitting station, a transmission suspension period which a synchronization processing unit (for example, the synchronization processing unit 302 in secondary transmitting station 40-1) outputs to a sensing unit (for example, the sensing unit 301 in secondary transmitting station 40-1) will be a common transmission suspension period within the secondary system. Concerning this transmission suspension period, a spectrum manager 34 can decide it and notify it to the secondary transmitting station. Also, a secondary transmitting station (for example, 40-1) which began communication first among the secondary transmitting stations in the vicinity can notify other secondary transmitting stations (for example, 40-2 and 40-3) in the secondary system of the transmission suspension period which is decided by itself.

A structure of the monitoring station 50 in this exemplary embodiment is, basically, the same as the monitoring station 32 (FIG. 5) of the second exemplary embodiment. However, a measured result outputted from a given interference estimation unit (given interference estimation unit 327 of the monitoring station 32) is different. Further, in the following description, the monitoring station 50 will be explained by using FIG. 5.

Figure 11:
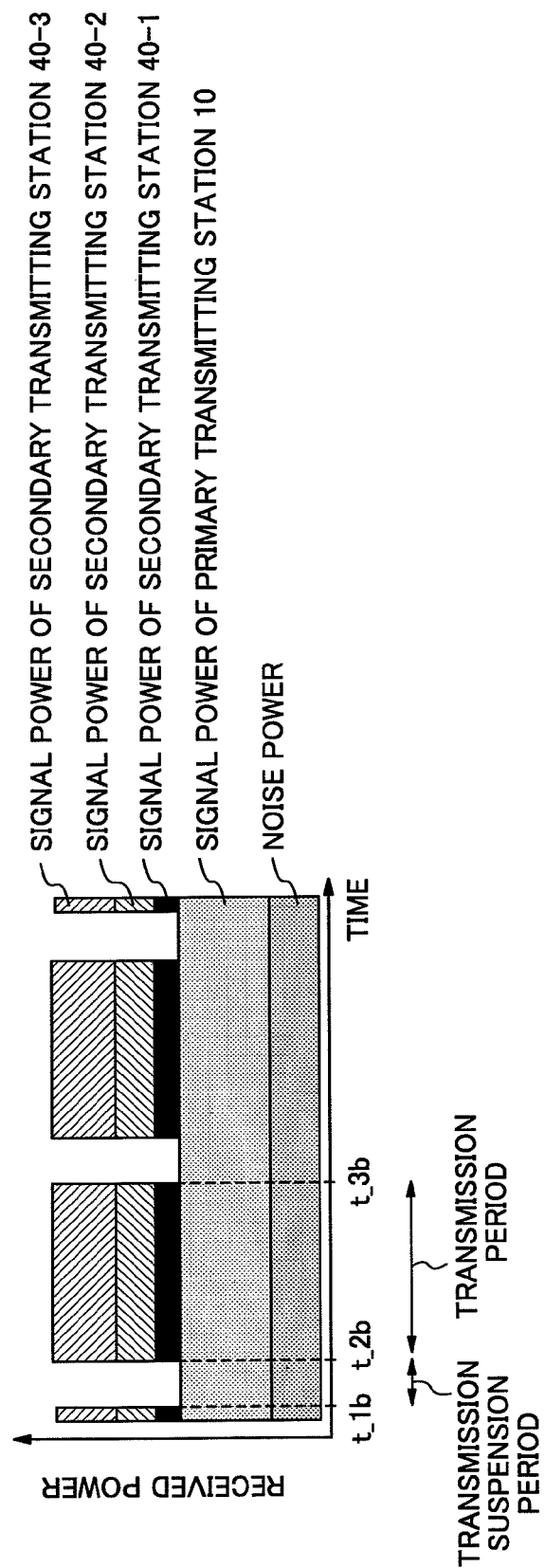
FIG. 11 is A figure showing an example of received power of a frequency band of a monitoring target received by a monitoring station of the third exemplary embodiment

FIG. 11 is a figure showing an example of received power which the monitoring station 50 receives in a frequency band which is a monitoring target. As a result of the synchronization of a transmission suspension period in a plurality of the secondary transmitting stations (40-1, 40-2 and 40-3) shown in FIG. 9, the monitoring station 50 receives a signal in which a signal of primary transmitting station 10 and a noise signal are superposed in a transmission suspension period. On the other hand, in a transmission period, in addition to a signal of the primary transmitting station 10 and a noise signal, signals of the secondary transmitting stations (40-1, 40-2 and 40-3) are superposed.

First, it is supposed that the monitoring station 50 receives a monitoring request from the secondary transmitting stations (40-1, 40-2 and 40-3). The reception level measurement unit 500 (refer to FIG. 5) of the monitoring station 50 operates the same as the reception level measurement unit 326 of the monitoring station 32 (that is, processing of (formula 1) and (formula 2) is performed). Also, the given interference estimation unit 510 (refer to FIG. 5) of the monitoring station 50 operates the same as the given interference estimation unit 327 of the monitoring station 32 (that is, processing of (formula 3) is performed). As a result, a value outputted from the given interference estimation unit 510 to the monitoring result generation unit 520 (refer to FIG. 5) of the monitoring station 50 will be total signal power (total amount of interference) of a plurality of the secondary transmitting stations (40-1, 40-2 and 40-3). The monitoring result generation unit 520 (refer to FIG. 5) of the monitoring station 50 transmits: inputted total amount of interference, CIR which is calculated based on total amount of interference, or an estimated result (estimated value of total amount of interference, estimated value of CIR) which corrected the difference in receiving environment of a primary receiving station and a monitoring station, to the spectrum manager 34 or each of the secondary transmitting station (40-1, 40-2 and 40-3). Also, it is possible to convert them into a judgment result or a transmission output value based on the total amount of interference, and transmit them to each of the secondary transmitting station (40-1, 40-2 and 40-3). It is possible to use a numerical value which subtracted the total amount of interference from the interference power permitted in a primary receiving station as a transmission output value (for example, when the total amount of interference exceeds the permissible value of the interference power by 2 dB, the transmission power fluctuation value will be −2 dB, and a direction which decreases the transmission power of secondary transmitting stations 40-1, 40-2 and 40-3 by 2 dB is issued).

According to the third exemplary embodiment described above, a monitoring station can estimate the total amount of interference which the secondary system causes as a whole.

This is because that a plurality of the secondary transmitting stations in a secondary system using a frequency band identical with a primary system synchronize a transmission suspension period and the monitoring station estimates the amount of interference after the synchronization.

Further, although it was assumed in the description above that a secondary transmitting station is a base station (that is, a secondary signal is a downlink signal), a case of a secondary terminal is also possible. In that case, each of the transmission suspension period in an uplink signals of secondary terminals which exist in the identical cell and which use a frequency band for a monitoring target is synchronized. By using the period, total amount of interference to a primary system by transmission of a plurality of secondary terminals in the cell can be measured by a monitoring station. Also, by synchronizing each of the transmission suspension period in this uplink signals not only among the secondary terminals in the cell but also among the secondary terminals of a plurality of cells, total amount of interference which an uplink signal of an entire secondary system causes to the primary system can be measured by the monitoring station.

The Fourth Exemplary Embodiment

In the third exemplary embodiment, it is described that estimating total amount of interference which a secondary system causes as a whole by using a transmission suspension period which synchronized among a plurality of the secondary transmitting stations. On the other hand, in some cases, it is necessary to estimate individual amount of interference of a secondary transmitting station. The example of the cases is that transmission power of a plurality of secondary transmitting stations is adjusted separately, or among a plurality of secondary transmitting stations, transmission of a secondary transmitting station which has large interference is to be suspended, and so on.

Accordingly, the fourth exemplary embodiment is, different from the third exemplary embodiment, in order to estimate an amount of interference to each secondary transmitting station, characterized by the point that a shifted transmission suspension period is used among a plurality of the secondary transmitting stations.

Figure 12:
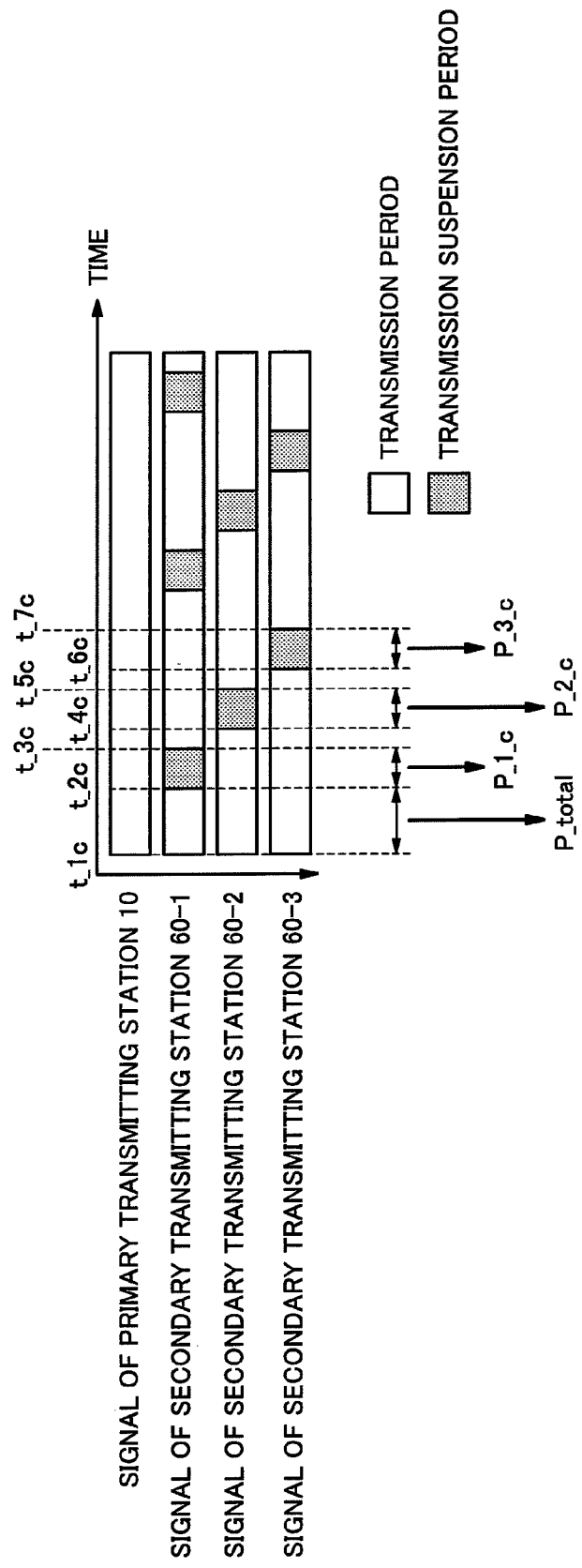
FIG. 12 is A figure showing an example of time structure of a signal of a secondary transmitting station in the fourth exemplary embodiment

FIG. 12 is a figure showing an example of time structure of a signal transmitted by a secondary transmitting station in the fourth exemplary embodiment. In FIG. 12, in addition to a signal of the primary transmitting station 10, signals of secondary transmitting stations 60-1, 60-2 and 60-3 in this exemplary embodiment are indicated. Different from an arrangement of a transmission suspension period in the third exemplary embodiment (FIG. 10), a transmission suspension period in each of the secondary transmitting station (60-1, 60-2 and 60-3) is assigned to different time. Specifically, a transmission suspension period of the secondary transmitting station 60-1 is a period indicated from time $t\_2c$ to time $t\_3c$. A transmission suspension period of the secondary transmitting station 60-2 is a period indicated from time $t\_4c$ to time $t\_5c$. A transmission suspension period of the secondary transmitting station 60-3 is a period indicated from time $t\_6c$ to time $t\_7c$. Further, the time structure shown in FIG. 12 is only an example and the time structure is not limited to this. For another example, each of transmission suspension starting time can be set as adding a predetermined offset to the transmission suspension starting time of a secondary transmitting station which is suspended earlier. For example, in case the offset is supposed to be δ, it is possible to set transmission suspension starting time of secondary transmitting station 60-2 which is suspended second in the series to be $t\_4c=t\_2c+\delta$, and transmission suspension starting time of secondary transmitting station 60-3 which is suspended third in the series to be $t\_6c=t\_4c+\delta$. Also, each of transmission suspension starting time can be asynchronous each other. Also, it is possible to make it in a state where there is no time interval between a certain transmission suspension period and the following transmission suspension period (that is, $t\_3c=t\_4c$ and $t\_5c=t\_6c$).

As mentioned above, the secondary transmitting station in the fourth exemplary embodiment uses the transmission suspension period that each of the secondary transmitting station is arranged in different time as shown in FIG. 12. Concerning determination of a transmission suspension period in this case, the spectrum manager 34 can decide it and notify it to each secondary transmitting station same as the third exemplary embodiment. Also, a transmission suspension period which is decided by a specific secondary transmitting station (for example, 60-1) can be notified to other secondary transmitting stations (for example, 60-2 and 60-3) in the secondary system, and be used. Also, information concerning a transmission suspension period notified to each secondary transmitting station is supposed to be: a starting time of the transmission suspension period, length of the transmission suspension period, its cycle time in case a transmission suspension period is inserted periodically, or offset information of a transmission suspension period and so on. Information concerning a transmission suspension period is the information which can grasp the transmission suspension period.

Although a structure of monitoring station 70 in this exemplary embodiment is, basically, the same as the monitoring station 32 (FIG. 5) of the second exemplary embodiment, it is different in a function of a reception level measurement unit (the reception level measurement unit 326 of the monitoring station 32) and a given interference estimation unit (the given interference estimation unit 327 of the monitoring station 32). In the following, although monitoring station 70 is explained by using FIG. 5, in this case, the reception level measurement unit 326 is replaced with the reception level measurement unit 700, the given interference estimation unit 327 is replaced with the given interference estimation unit 710 and the monitoring result generation unit 328 is replaced with the monitoring result generation unit 720.

When the reception level measurement unit 700 measures received power in a frequency band of a monitoring target, the reception level measurement unit 700 separates into a transmission period of all secondary transmitting stations (60-1, 60-2 and 60-3) and a transmission suspension period of each secondary transmitting station measures the received power in the period individually. Here, the received power in the transmission period (from time $t\_1c$, time $t\_2c$) is supposed to be P_total. Also, the received power in the transmission suspension period (from time $t\_2c$ to time $t\_3c$) of secondary transmitting station 60-1 is supposed to be $P\_1\_c$. The received power in the transmission suspension period (from time $t\_4c$ to time $t\_5c$) of the secondary transmitting station 60-2 is supposed to be $P\_2\_c$. The received power in the transmission suspension period (from time $t\_6c$ to time $t\_7c$) of the secondary transmitting station 60-3 is supposed to be $P\_3\_c$. The reception level measurement unit 700 outputs P_total, $P\_1\_c$, $P\_2\_c$ and $P\_3\_c$ mentioned above to the given interference estimation unit 710.

In the given interference estimation unit 710, an amount of interference $P'\_i\_c$ (i=1, 2, 3) of each secondary transmitting station (60-1, 60-2 and 60-3) is calculated by carrying out (formula 4) by using each inputted received power (P_total, P_1_c, P_2_c, P_3_c).

$$P'\_i\_c = P\_total - P\_i\_c \quad \text{(formula 4)}$$

Also, in case the received power of primary signal (P_primary) is to be obtained in order to calculate CIR, (formula 5) is carried out in the given interference estimation unit 710.

$$P\_primary = P\_total - \sum_{i=1}^{3} P'\_i\_c - P\_noise \quad \text{(formula 5)}$$

In (formula 5), P_noise is noise power which is generated in a secondary receiving station and is measured or estimated in advance.

An amount of interference or CIR calculated in the given interference estimation unit 710 is transmitted to the monitoring result generation unit 720 of the monitoring station 70, and is transmitted to each secondary transmitting station (60-1, 60-2 and 60-3) and the spectrum manager 34 as a measured result, an estimated result or a transmission output value.

Each secondary transmitting station (60-1, 60-2 and 60-3) can utilize the individual amount of interference transmitted from the monitoring station 70 for individual transmission control in a secondary transmitting station. Also, the spectrum manager 34, can control such that decreasing transmission power of a secondary transmitting station with a large amount of interference (or suspends transmission), or increasing secondary transmission power with a small amount of interference (or permits a secondary transmitting station which is not transmitting yet of transmission) by using the individual amount of interference transmitted from monitoring station 70.

According to the fourth exemplary embodiment described above, a monitoring station can estimate an individual amount of interference of each secondary transmitting station. This is because a transmission suspension period assigned to each of a plurality of the secondary transmitting stations in a secondary system which uses same frequency band of the primary system is different in time domain. By using an individual estimated value of an amount of interference of a secondary transmitting station, it becomes possible to perform transmission control effectively at each secondary transmitting station.

Figure 13:
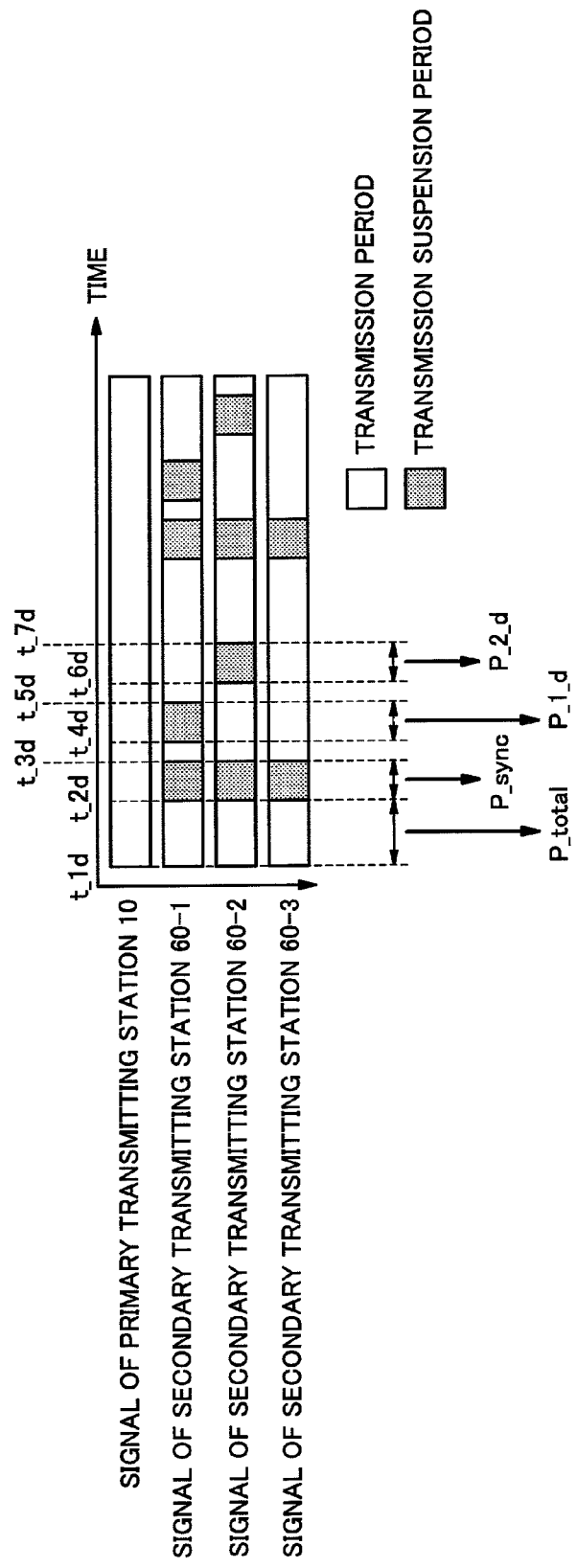
FIG. 13 is A figure showing an example of time structure of a signal of a secondary transmitting station in the fourth exemplary embodiment

Further, in the description mentioned above, although it was supposed that a transmission suspension period in each secondary transmitting station is assigned to different time, it is also possible to make it a time arrangement where a synchronized transmission suspension period is included. For example, it is possible to make a transmission suspension period into a time arrangement like FIG. 13. In FIG. 13, from time t_2d to time t_3d is a transmission suspension period which synchronized among the secondary transmitting stations (60-1, 60-2 and 60-3). On the other hand, from time t_4d to time t_5d is a transmission suspension period of the secondary transmitting station 60-1, and from time t_6d to time t_7d is a transmission suspension period of the secondary transmitting station 60-2. In this case, the reception level measurement unit 700 of the monitoring station 70 measures the received power in the transmission period and each transmission suspension period. Here, suppose that the received power from time t_1d to time t_2d is set to P_total, the received power from time t_2d to time t_3d is set to P_sync, the received power from time t_4d to time t_5d is set to P_1_d, and the received power from time t_6d to time t_7d is set to P_2_d. The given interference estimation unit 710 calculates an amount of interference P'_i_d (i=1, 2, 3) of each secondary transmitting station (60-1, 60-2 and 60-3) by calculating (formula 6) and (formula 7) using each received power (P_total, P_sync, P_1_d and P_2_d).

$$P'\_i\_d = P\_total - P\_i\_d \quad \text{(formula 6)}$$
$$(i = 1, 2)$$

$$P'\_i\_d = P\_total - P\_sync - \sum_{i=1}^{2} P'\_i\_d \quad \text{(formula 7)}$$
$$(i = 3)$$

As described above, even if a transmission suspension period which synchronized among each secondary transmitting station is being used in part, this exemplary embodiment can calculate an amount of interference of each secondary transmitting station individually. Also, in case the transmission suspension period of each secondary transmitting station overlaps in part, same as this example, by measuring reception level separately for time where the transmission suspension period overlaps and for time where it does not overlap, an amount of interference of each secondary transmitting station can be calculated individually.

The Fifth Exemplary Embodiment

According to the second to fourth exemplary embodiment mentioned above, the reception level in the transmission suspension period and the transmission period was measured by the reception level measurement unit of the monitoring station, and an amount of interference was estimated by using a measured value of a reception level by the given interference estimation unit. In this exemplary embodiment, an embodiment which further takes time fluctuation of reception level of a signal into consideration will be described. However, concerning the configuration same as the exemplary embodiment mentioned above, in order to make description clear, it will be omitted.

Figure 14:
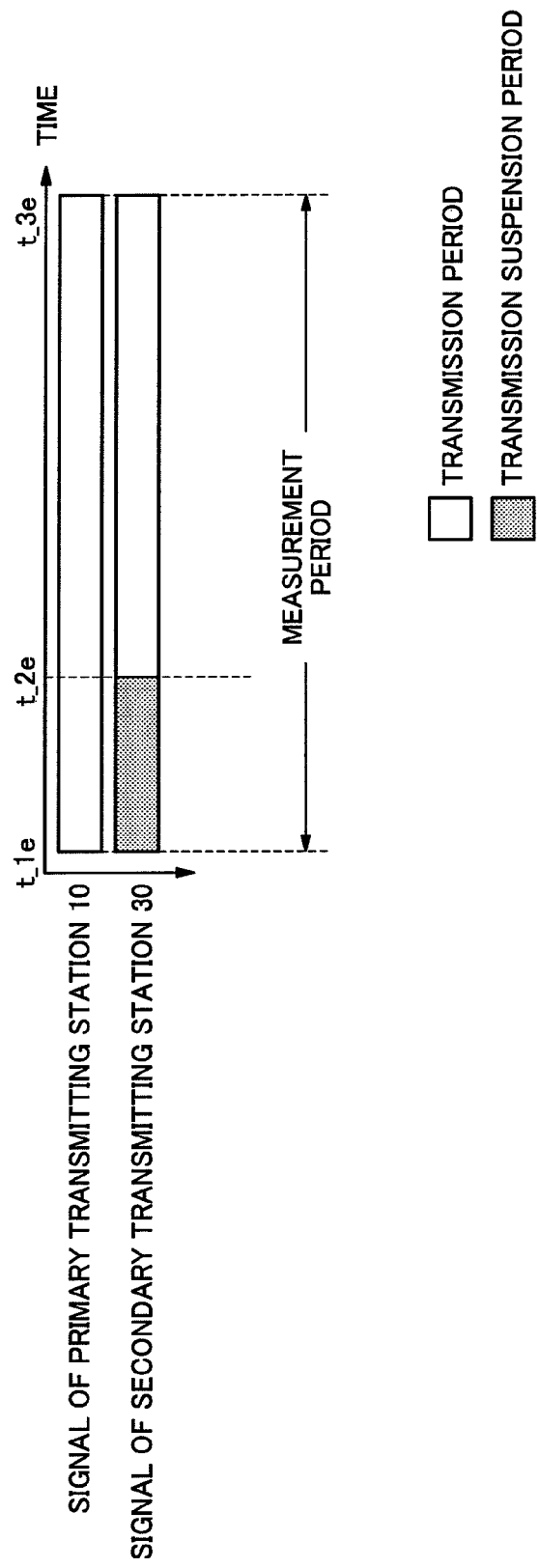
FIG. 14 is A figure showing an example of time structure of a secondary signal in case a single transmission suspension period is employed
Figure 15:
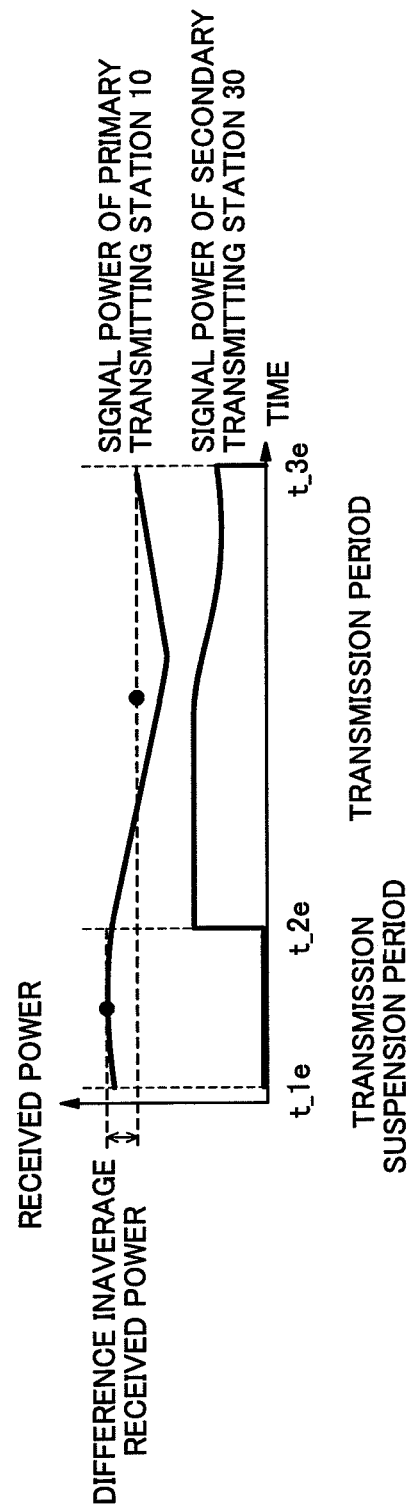
FIG. 15 is A figure showing an example of received power of a monitoring station with time structure of FIG. 14

FIG. 14 is a figure showing an example of time structure of a signal in case a single transmission suspension period is set within a measurement period same as the secondary transmitting station 30 of the second exemplary embodiment. Also, FIG. 15 represents an example of received power at a monitoring station in case a signal level involves time fluctuation at that time. In FIG. 14, a measurement period of a reception level measurement unit is configured from time t_1e to time t_3e. During the period, a transmission suspension period is configured from time t_1e to time t_2e and a transmission period is configured from time t_2e to time t_3e. Average received power which the reception level measurement unit measured at each of a transmission suspension period and a transmission period under this time structure of a signal is shown in FIG. 15.

Here, the signal power of the secondary transmitting station 30 and signal power of primary transmitting station 10 are both fluctuating in time. For the reason of the time fluctuation of signal level, for example, fading can be considered. In case there is fluctuation of a signal level by fading, there is a possibility that a gap may occur between the signal power of the primary transmitting station 10 in the transmission suspension period and the signal power of the primary transmitting station 10 in the transmission period. According to the second to the fourth exemplary embodiment, by using the fact that signal power and noise power of primary transmitting station 10 in a transmission period is at a similar level as signal power and noise power of primary transmitting station 10 in a transmission suspension period, an amount of interference was calculated by subtracting the received power in the transmission suspension period from the received power in the transmission period. However, when the gap of the signal power mentioned above becomes large, estimation accuracy of the amount of interference deteriorates According to this exemplary embodiment, a structure which set a plurality of transmission suspension periods is adopted so that influence of the time fluctuation mentioned above can be suppressed. Further, in the following description, a secondary transmitting station in this exemplary embodiment is supposed to be a secondary transmitting station 80. A structure of the secondary transmitting station 80 is identical with the secondary transmitting station 30 of the second exemplary embodiment (FIG. 4). Accordingly, FIG. 4 will be used for the description of the secondary transmitting station 80. Also, in the following description, a monitoring station in this exemplary embodiment is supposed to be a monitoring station 90. A structure of the monitoring station 90 is identical with the monitoring station 32 of the second exemplary embodiment (FIG. 5). Accordingly, FIG. 5 will be used for the description of the monitoring station 90.

Figure 16:
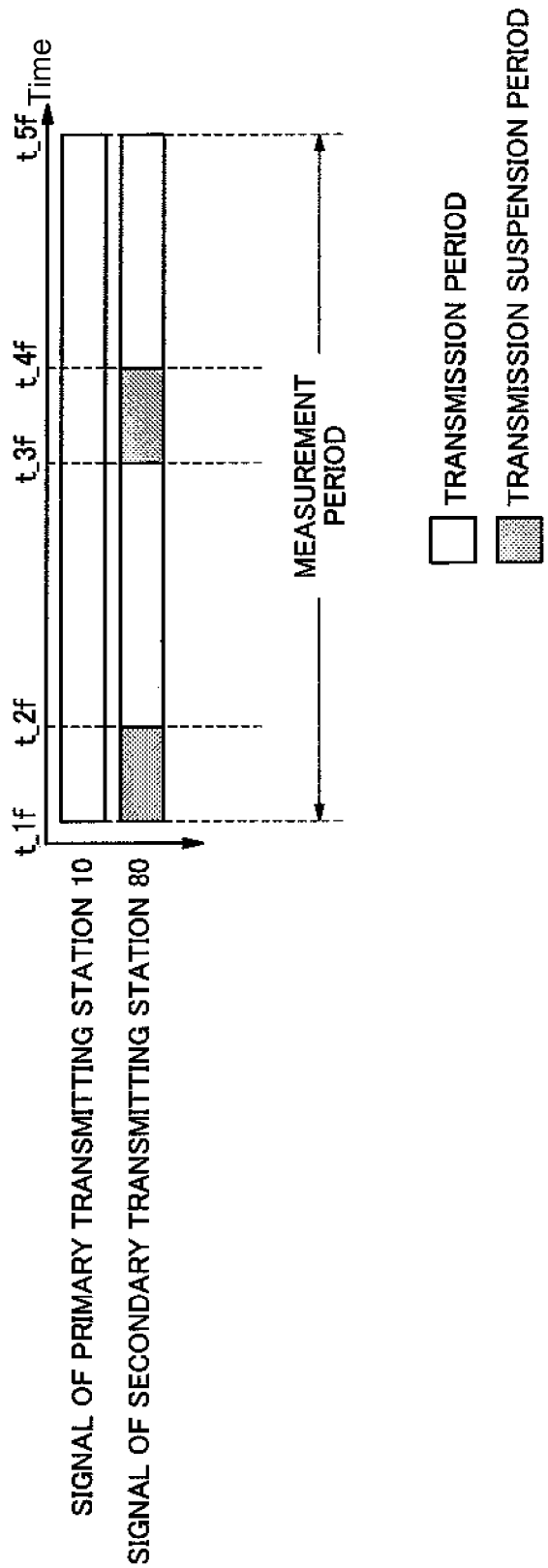
FIG. 16 is A figure showing an example of time structure of a signal of a secondary transmitting station in the fifth exemplary embodiment of the present invention

FIG. 16 indicates an example of time structure of a signal of the secondary transmitting station 80 in the fifth exemplary embodiment and indicates a case where a plurality of transmission suspension periods are installed in a measurement period. In FIG. 16, a transmission suspension period has two periods. One transmission suspension period is from time t_1f to time t_2f and the other transmission suspension period is from time t_3f to time t_4f. At the secondary transmitting station 80, a plurality of the transmission suspension periods are set in the measurement period as above. Of course, in the fifth exemplary embodiment, the transmission suspension periods arranged are not limited to two and can be set to no smaller than three.

Figure 17:
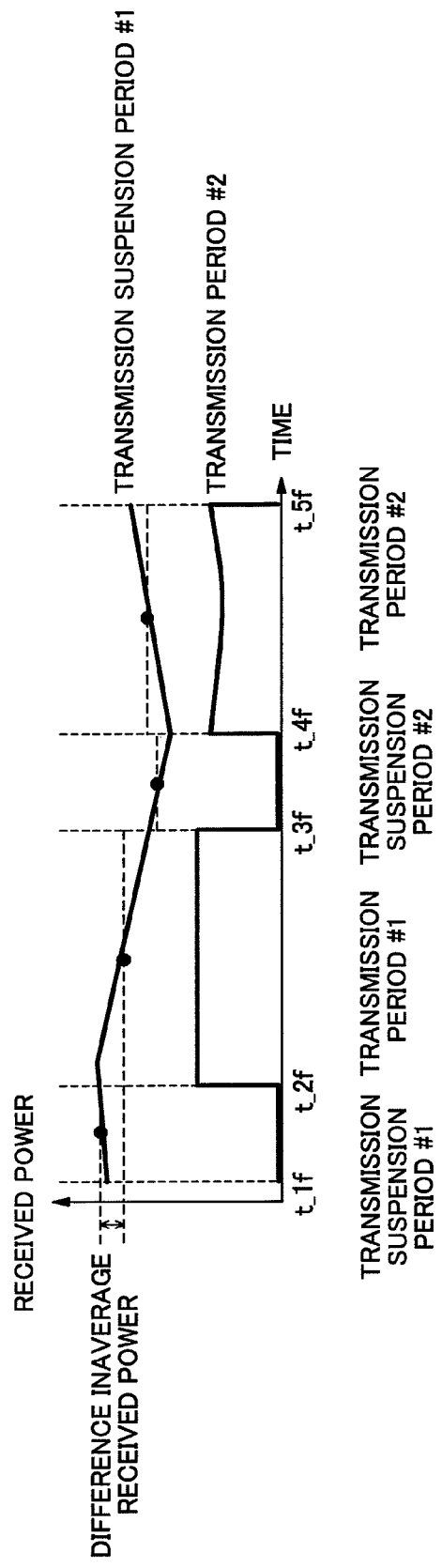
FIG. 17 is A figure showing an example of received power of a monitoring station with time structure of FIG. 16

FIG. 17 expresses an example of the received power received by the monitoring station 90 in case of the time structure of a signal shown in FIG. 16. The reception level measurement unit 900 of the monitoring station 90 (refer to FIG. 5) measures received power in each of the transmission suspension period #1, #2 and each of the transmission period #1 and #2, respectively. In FIG. 17, the transmission suspension period #1 is a period from time t_1f to time t_2f and the transmission suspension period #2 is a period from time t_3f to time t_4f. Also, in FIG. 17, the transmission period #1 is a period from time t_2f to time t_3f and the transmission period #2 is a period from time t_4f to time t_5f. Here, suppose the received power in the transmission suspension period #1 is set to P_1_OFF, received power in the transmission suspension period #2 is set to P_2_OFF, the received power in the transmission period #1 is set to P_1_ON, and the received power in the transmission period #2 is set to P_2_ON. The reception level measurement unit 900 calculates the average of the received power of each of the transmission suspension period and the transmission period after measuring each received power. For example, in case of FIG. 17, the average received power in the transmission suspension period is (P_1_OFF+P_2_OFF)/2 and the average received power in the transmission period is (P_1_ON+P_2_ON)/2. The given interference estimation unit 910 of the monitoring station 90 (refer to FIG. 5) calculates a difference value of the average received power by carrying out (formula 3) using each average received power of the transmission suspension period and the transmission period calculated by the reception level measurement unit 900, and makes this numerical value the amount of interference.

According to the fifth exemplary embodiment described above, a plurality of the transmission suspension periods are set in a measurement period, and an amount of interference is calculated from the average received power of each transmission suspension period and the average received power of each transmission period. By doing so, even in case a reception level of a signal fluctuates in time, by estimating primary signal power in a transmission period as average received power among a plurality of transmission suspension periods, gap (error) caused by fluctuation in time can be made small. Accordingly, estimation accuracy of an amount of interference can be improved.

According to the first to the fifth exemplary embodiment described above, at least, it becomes possible, without changing a structure of a primary system (another wireless system), to grasp interference from a secondary system (own wireless system) to the primary system with high accuracy and in conformity with actual environment.

Further, in the first to fifth exemplary embodiment described above, a reception level (for example, received power) can not only be measured directly but also be estimated from a characteristic quantity specific to a signal. For example, in case a pilot signal is included in a transmission signal of a secondary transmitting station, it is possible to estimate by using a correlation value calculated by sliding correlation of a pilot signal. Specifically, it is possible to calculate a correlation value by performing sliding correlation to a pilot signal received actually and a known pilot signal, to find a maximum correlation value, to estimate received power of the pilot signal from the numerical value, and further, to estimate total received power (total power value of a pilot signal and a data signal). Here, calculation of received power of a pilot signal can be done by holding a table illustrating corresponding relationship between the maximum correlation value and received power of the pilot signal in advance and by searching the table concerned using the maximum correlation value calculated as a key.

Figure 18:
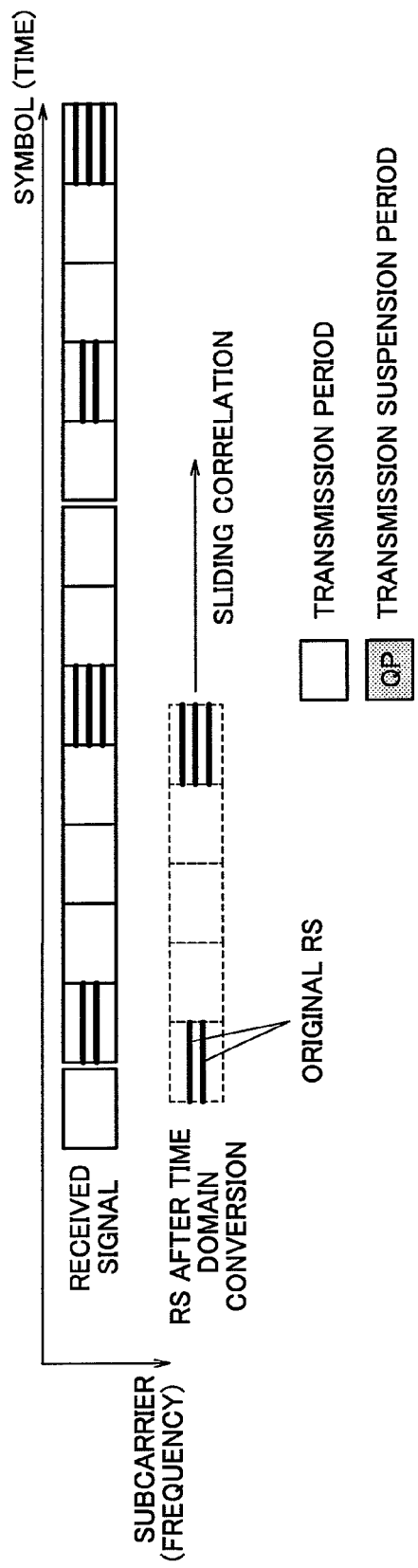
FIG. 18 is A conceptual diagram to illustrate sliding correlation
Figure 19:
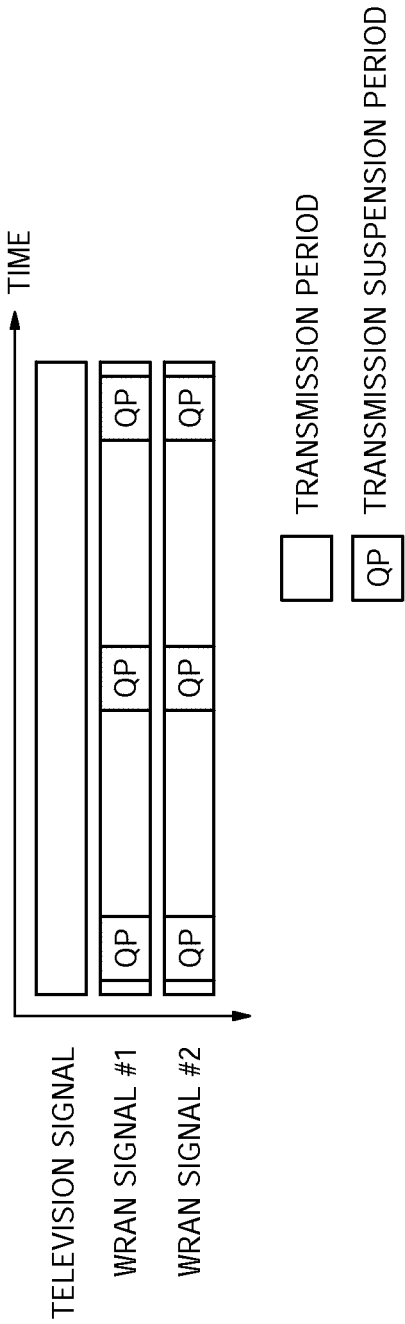
FIG. 19 is A figure showing time structure of Quiet Period in a WRAN system

FIG. 18 is a conceptual diagram illustrating sliding correlation. For example, in case a transmission signal of a secondary transmitting station is an LTE (Long Term Evolution) downlink signal, the secondary transmitting station notifies a monitoring station to which it requests to monitor of its own cell ID (Identification). At the monitoring station, RS (Reference Signal: which is a known pilot signal used for channel estimation and so on, and is linked to a cell ID) corresponding to the notified cell ID is generated, and further, it is converted into a time domain.

$$T_{max} = \max_{0 \le n \le N-1} \left| \frac{1}{K} \sum_{k=0}^{k-1} y(n+k) i_p^*(k) \right| \quad \text{(formula 8)}$$

By the calculation formula indicated in (formula 8), maximum correlation value $T_{max}$ is calculated from sliding correlation between a complex conjugate (i*p(k)) of an RS signal after a time domain conversion and a received signal (y(n+k)), the table mentioned above is searched using the maximum correlation value as a key, and the pilot received power is obtained. Further, in (formula 8), K shows length of RS series in a time domain. A monitoring station transmits an obtained pilot received power value to a secondary transmitting station. Also, at a secondary transmitting station, total received power at the monitoring station (that is, amount of interference) can be estimated using a power ratio of the total transmission power including a data division and the pilot transmission power and a pilot received power value transmitted from the monitoring station.

Also, in the first to fifth exemplary embodiment described above, a primary system and a secondary system can be different RAT (Radio Access Technology) or can be identical RAT. As an example in case of different RAT, as described above, for example, a combination of a TV broadcast system and a cellular system can be mentioned. As an example in case of identical RAT, for example, a primary system can be a macro cell and a secondary system can be a femto cell installed in it.

Further, the first to fifth exemplary embodiment described above can be embodied as certain hardware, for example, a circuit.

Also, the first to fifth exemplary embodiment described above can be made to be controlled by a computer circuit which is not illustrated (for example, CPU (Central Processing Unit)) based on a control program, and to operate. In this case, these control programs are stored, for example, in a storage medium inside a device or a system, (for example, ROM (Read Only Memory) or hard disk and so on), or in an external storage medium (for example, removable media or a removable disk and so on), and are read by the computer circuit mentioned above and are executed.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A wireless station comprising:
a synchronization unit configured to synchronize with a transmission suspension period of a transmitting station of a wireless system;
a measurement unit configured to measure a reception level of a wireless signal of said transmitting station in a transmission period and a reception level in the transmission suspension period; and
an interference estimation unit configured to estimate an amount of interference to another wireless system according to the measured reception level in the transmission suspension period and reception level in the transmission period in order to control the transmission of said transmitting station.

2. The wireless station according to claim 1,
wherein the wireless system comprises a plurality of transmitting stations, each of the transmitting stations has a transmission suspension period, and each of the transmission suspension periods of the plurality of transmitting stations is synchronized with one another.

3. The wireless station according to claim 1,
wherein the wireless system comprises a plurality of transmitting stations, each of the transmitting stations has a transmission suspension period, and each of the transmission suspension periods of the plurality of transmitting stations is assigned to a different time.

4. The wireless station according to claims 1,
wherein the transmitting station has a plurality of transmission suspension periods and the measurement unit measures the reception level within each of the plurality of the transmission suspension periods and averages the measured reception levels.

5. The wireless station according to claims 1,
wherein the measurement unit measures reception levels by the use of spectrum sensing which detects a wireless signal.

6. The wireless station according to claims 1,
wherein the interference estimation unit estimates an amount of interference to the other wireless system by subtracting the measured reception level in the transmission suspension period from the measured reception level in the transmission period.

7. The wireless station according to claims 1,
wherein the interference estimation unit estimates a reception level of the other wireless system by subtracting a noise level measured or estimated in advance from the reception level measured within the transmission suspension period.

8. The wireless station according to claims 1,
wherein the synchronization unit synchronizes the transmission suspension period based on information received from the other wireless system, which includes at least one of: a starting time of the transmission suspension period, a length of time of the transmission suspension period, a cycle time of the transmission suspension period, and an offset from different transmission suspension periods.

9. An interference estimation method comprising:
synchronizing a transmission suspension period of a transmitting station of a wireless system;
measuring a reception level of a wireless signal of said transmitting station during a transmission period and a reception level during the transmission suspension period; and
estimating an amount of interference to another wireless system according to the measured reception level in the transmission suspension period and the measured reception level in the transmission period in order to control the transmission of said transmitting station.

10. A wireless communication system comprising:
a transmitting station which transmits a wireless signal comprising a transmission period and a transmission suspension period; and
a monitoring station which synchronizes the transmission suspension period of said transmitting station, measures a reception level of a wireless signal of said transmitting station during the transmission period and during the transmission suspension period, and estimates an amount of interference to another wireless system according to the measured reception level in the transmission suspension period and the measured reception level in the transmission period in order to control the transmission of said transmitting station.

11. A non-transitory computer readable information recording medium storing a program which, when executed by a processor, performs a method comprising:
synchronizing a transmission suspension period of a transmitting station of a wireless system,
measuring a reception level of a wireless signal of said transmitting station during a transmission period and during a transmission suspension period,
estimating an amount of interference to another wireless systems according to the reception level in the transmission suspension period and the reception level in the transmission period in order to control the transmission of said transmitting station.

12. The wireless station of claim 1, further comprising:
a network communication unit configured to transmit a signal that includes information indicating the estimated amount of interference.

13. The interference estimation method of claim 9, further comprising:
transmitting a signal comprising information indicating the estimated amount of interference.

14. The wireless communication system of claim 10, wherein the monitoring station transmits information indicating the estimated amount of interference.

\* \* \* \* \*